US006851108B1

(12) United States Patent
Syme et al.

(10) Patent No.: US 6,851,108 B1
(45) Date of Patent: Feb. 1, 2005

(54) VERIFYING INTERMEDIATE LANGUAGE CODE

(75) Inventors: Don Syme, Cambridge (GB); Andrew Gordon, Cambridge (GB); Jonathan A. Forbes, Bellevue, WA (US); Vance P. Morrison, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 09/714,324

(22) Filed: Nov. 16, 2000

Related U.S. Application Data

(63) Continuation-in-part of application No. 09/388,176, filed on Sep. 1, 1999.

(51) Int. Cl.⁷ .............................................. G06F 9/45
(52) U.S. Cl. ..................... 717/146; 717/139; 717/148; 717/118
(58) Field of Search ............................... 717/146, 116, 717/118, 148, 151–153, 166, 139

(56) References Cited

U.S. PATENT DOCUMENTS

| | | | | |
|---|---|---|---|---|
| 5,659,753 | A | * 8/1997 | Murphy et al. | ............. 717/147 |
| 5,668,999 | A | 9/1997 | Gosling | |
| 5,740,441 | A | 4/1998 | Yellin et al. | |
| 5,748,964 | A | 5/1998 | Gosling | |
| 5,999,731 | A | 12/1999 | Yellin et al. | |
| 6,075,940 | A | 6/2000 | Gosling | |
| 6,092,147 | A | 7/2000 | Levy et al. | |

OTHER PUBLICATIONS

White–Gartwaite, The GC Interface in the EVM, Dec. 1998, Sun Microsystems, SML TR–98–67.*
Laukkanen, Real–time Java—Memory Management, Date unknown, University of Helsinki, Department of Computer Science.*

Thorn, "Programming Languages for Mobile Code," ACM Computing Surveys, vol. 29, No. 3, Sep. 1997.

Rémy et al., "Objective Caml—A general purpose high–level programming language," *ERCIM News* No. 36, available at http://caml.inria.fr/ercim.html [accessed Jun. 1, 1999].

Rouaix, "A Web Navigator with applets in Caml," *Computer Networks and ISDN Systems*, vol. 28, Nos. 7–11, Proceedings of the Fifth International World Wide Web Conference, Paris, France, May 6–10, 01996.

"Cmm and Java Compared: A comparison of modern languages for the internet and WorldWide Web," published Apr. 1997, available at http://www.nombas.com/us/otherdoc/javavcmm.htm [accessed Jul. 12, 1999].

Howard, "Eiffel A Quick Overview," Journal of Object–Oriented Programming, vol. 5, No. 8, Jan. 1993.

(List continued on next page.)

Primary Examiner—Antony Nguyen-Ba
(74) Attorney, Agent, or Firm—Microsoft Corporation

(57) ABSTRACT

A verification module evaluates intermediate language code to verify that the code is type safe before passing the code for execution. Code that is not deemed type safe can cause execution errors, corrupt the runtime environment in which the code is executing, or cause unauthorized access to protected system resources. As such, the verification module protects a computer system from intentional or inadvertent breaches of the computer system's defenses. The verification module verifies the type safety of intermediate language code that supports significant high-level language constructs prohibited by verification modules in the prior art. One exemplary verification module verifies intermediate language code that includes one or more reference-based parameter, such as a pointer (or reference), a value class containing pointers, a RefAny parameter, or a nested pointer.

86 Claims, 20 Drawing Sheets

OTHER PUBLICATIONS

Schoenefeld, "Object–oriented Design and Programming: An Eiffel, C++, and Java Course for C Programmers," University of Tulsa, OK, Proceedings of the twenty–eight SIGCSE Technical Symposium on Computer Science Education, vol. 29, No. 1, Mar. 1997.

"Web Programming Languages," available at http://www.objs.com/survey/lang.htm [accessed Jul. 12, 1999].

Leroy et al., "Security properties of typed applets," Proceedings of the 25$^{th}$ ACM SIGPLAN–SIGACT Symposium on Principles of Programming Languages, San Diego, CA, Jan. 19–21, 1998.

Necula et al., "Safe Kernel Extensions Without Run–Time Checking," Carnegie Mellon University, Pittsburgh, PA, Proceedings of the Second Symposium on Operating Systems Design and Implementation, Seattle, WA, Oct. 28–31, 1996.

Wahbe et al., "Efficient Software–Based Fault Isolation," University of California, Berkeley, CA, Proceedings of the 14$^{th}$ ACM Symposium on Operating Systems Principles, 1993.

Necula et al., "Safe, Untrusted Agents using Proof–Carrying Code," Carnegie Mellon University, Pittsburgh, PA, submitted to Lecture Notes in *Computer Science* Special Issue on Mobile Agents, Oct. 1997.

Necula et al., "Proof–Carrying Code," Carnegie Mellon University, Pittsburgh, PA, Proceedings of the 24$^{th}$ Annual ACM SIGPLAN–SIGACT Symposium on Principles of Programming Languages, Paris, France, Jan. 15–17, 1997.

Dorwood et al., "Inferno," Proceedings IEEE COMPCON, San Jose, CA, Feb. 23–26, 1997.

"A comparison of Inferno and Java," Computing Sciences Research Center of Bell Labs, Murray, NJ White Paper available at http://www,lucent–inferno.com [accessed Jul. 12, 1999].

"Inferno User's Guide." pp.1–1 through 1–14.

Thorn, "Programming Languages for Mobile Code," *ACM Computing Surveys*, vol. 29, No. 3, Sep. 1997.

Gostling et al., "The Java ™ Language Environment," White Paper, Sun Microsystems, Mountain View, CA, May 1996.

Franz et al., "Does Java Have Allternatives," University of California, Irvine, CA, Proceedings of the Third California Software Symposium (CCS 1997).

Youmans, "Java: Cornerstone of the Global Network Enterprise," Virginia Tech, Spring 1997.

Ortiz, Jr., "The Battle over Real–Time Java," *Computer*, Jun. 1999.

"Elements of comparison Java/Hotjava vs. Caml/MMM," available at http://pauillac.inria.fr/~rouaix/mmm/current/javacomp.html [accessed May 28, 1999].

Kramer et al., "The Java™ Platform," Sun Microsystems 1997 available at http://www.javasoft.com/docs/white/platform/javaplatformTOC.doc.html [accessed Jul. 22, 1999].

Liang et al., "Dynamic Class Loading in the Java™ Virtual Machine," Sun Microsystems, Palo Alto, CA,ACM Sigplan Notices, vol. 33, No. 10, Oct. 1998.

Yelland, "A Compositional Account of the Java™ Virtual Machine," Sun Microsystems, Palo Alto, CA, Proceedings of the 26$^{th}$ ACM SIGPLAN–SIGACT on Principles of Programming Languages, 1999.

Goldberg, "A Specification of Java Loading and Bytecode Verification," Kestrell Institute, Palo Alto, CA, Proceedings of the 5$^{th}$ ACM Conference on Computer and Communications Security, 1998.

Franz et al., "Introducing Juice," University of California, Irvine, CA, Oct. 30, 1996, available at http://caesar.ics.uci.edu/intro.html [accessedJul. 7, 1999].

Waddington et al., "Java: Virtual Machine for Virtually Any Platform," Embedded Systems Programming, vol. 9, No. 6, Jun. 1966.

Gosling et al., "Java Intermediate Bytecodes," Proceedings ACM Sigplan Workshop on Intermediate Representations, San Francisco, CA, Jan. 22, 1995. ACM SIGGPLAN Notices, vol. 30, No. 3, Mar. 1995.

Frascadore, "Java Application Server Security Using Capabilities," *Java™ Report*, Mar. 1999, pp. 31–42.

Zhang, "Secure Code Distribution," *Computer*, vol. 30, Issue 6, Jun. 1997, pp. 76–79.

Hester et al., "Building Flexible and Extensible Web Applications with Lua," *Journal of Universal Computer Science*, vol. 4, No. 9, 1998, pp. 748–762.

Waldo, "Programming with Java," *Unix Review*, May 1996, pp. 31–37.

Harbison, "Modula–3," *BYTE*, vol.15, No. 12, Nov. 1990, pp. 385–392.

The Modula–3 Programming Language, Dr. Dobb's Journal, vol. 19, No. 12, Winter 1994.

Grimm et al., "Access Control for the SPIN Extensible Operating System," University of Washington, Seattle, WA, IEEE Symposium on Security and Privacy, 1997, p. 205.

Robinson, "Modula–3 in an undergraduate Computer Science course," The Second International MODULA–2 Conference, 'MODULA–2 and BEYOND', Sep. 11, 1991.

Templ, "Oberon vs. C++," The Modula Tor, Oberon–2 and Modula–2 Technical Publication, No. 9, Oct. 1994.

Adl–Tabatabi et al., "Efficient and Language–Independent Mobile Programs," ACM Sigplan Notices, vol. 31, No. 5, May 1996.

"Differences Between Phantom and Java," from Internet at http://www.apocalypse.org/pub/u/antony/phantom/javadiffs.htm [accessed Jul. 19, 1999].

Rook, "A Language Collector Comments on: Java, Perl & Python," available at http://www.chips.navy.mil/chips/archives/97 [accessed Jul. 12, 1999].

Masse, "Development Strategies for Better Software: An Analysis of Two Next–Generation Languages: Java and Python," Fifth Python Workshop, Nov. 26, 1996, from Pythin website http://www.python.org/~masse/papers/java–python96 [accessed Jul 12, 1999].

"Development Strategies for Better Software," Fifth Python Workshop, Dec. 12, 1996, from Python website http://www.python.org/~masse/papers/java–python96.

Nicolaou, "CS 642 Term Paper: A survey of distributed languages," Python website, May 9, 1996.

Van Rossum, "Grail—The Browser for the Rest Of Us (Draft)," Corporation for National Research Initiatives, Reston, Virginia, May 30, 1996, from Internet.

Van Rossum, "Grail—An Extensible Interface For Browsing The Web And More," Corporation for National Research Initiatives, Reston Virginia, Nov. 1995.

"Comparison [of Grail] to HotJava," available at http://grail.cnri.reston.va.us/grail/info/java.htm [accessed May 28, 1999].

Gritzalis et al., "Security Issues Surrounding Programming Languages," SIGOPS *Operating Systems Review*, vol. 32, No. 2, Apr. 1998.

Small. "MiSFIT: A Freely Available Tool for Building Safe Extensible Systems," Harvard University, Technical Report 07–96, 1996.

Domel, "Interaction of Java and Telescript Agents," Mobile Obeject Systems Towards the Programmable Internet, Second International Workshop, MOS '96, Linz, Austria, Jul. 8–9, 1996.

Tardo et al., "Mobile Agent Security and Telescript," General Magic, Inc., Sunnyvale, CA, IEEE COMPCON, 1996.

Gray, "Agent Tcl: A flexible and secure mobile–agent system," thesis for Dartmouth College, Hanover, New Hampshire, Jun. 30, 1997.

Lampson, "A Description of the Cedar Language," Xerox Palo Alto Research Center, Palo Alto, CA, Dec. 1983.

Identification of Reference Chart, BACKHOUSE, *Program Construction and Verification*, Prentice Hall, 1986.

Identification of Reference Chart, Craigen et al, Formal Methods of Trustworthy Computer Systems, Springer–Verlag, 1990.

Girard, "Inferno Promises Multiplatform OS," Computerworld, vol. 30, No. 21, May 20, 1996.

Wirth, "From Modula to Oberon," Computersysteme, Zurich, Switzerland, Nov. 1990.

Van Rossum, *Python Reference Manual*, v.1.2, Centrum voor Wiskunde en Informatica (CWI), Amsterdam, The Netherlands, Apr. 10, 1995.

Fritzinger et al., "Java™ Security," Sun Microsystems, 1996.

Ousterhout et al., "The Safe–Tcl Security Model," Sun Microsystems, Mountainview, CA, Mar. 26, 1997.

Bernard, "Inferno Security," Lucent Technologies –White Paper, available at Lucent Website, http://www.lucent.com [accessed Aug. 27, 1999].

Winterbottom et al., "The design of the Inferno virtual machine," Bell Labs, Lucent Technologies, available at http://plan9bell–labs.com [accessed Aug. 30, 1999].

Yellin, "The JIT Compiler API," Sun Microsystems, Oct. 4, 1996.

Stamos et al., "Implementing Remote Exaluation," IEEE Transctions on Software Engineering, vol. 16, No. 7, Jul. 1990.

Stamos et al., "Remote Evaluation," Massachusetts Institute of Technology, ACM Transactions on Programming Languages and Systems, vol. 12, No. 4, pp. 537–565, Oct. 1990.

Deutsch et al., "A Flexible Measurement Tool For Software Systems," University of California, Berkeley, CA Information Processing 72, North Holland Publishing Company, 1972.

Naur, "Checking of Operand Types in Algol Compilers," BIT, vol. 5, 1965, pp.151–163.

Aho et al., *Compilers Principles, Techniques, and Tools*, Addison–Wesley Publishing, 1986, Chapter 6, Type Checking, pp. 343–388.

Goodwin, "Conditions for Underflow and Overflow of Stack," The Computer Journal, vol. 20, No. 1, pp. 56–62, Feb. 1977.

McGraw et al., *Securing JAVA:Getting Down to Business with Mobile Code*, "Type Safety," ISBN 047131952X (John Wiley & Sons), 1996.

McGraw et al., "Java Security and Type Saftey," BYTE Magazine, Jan. 1997.

* cited by examiner

| Type of Data | Passing Convention | How Data is Passed |
|---|---|---|
| Built-in value type (e.g., int, float, etc.) | By Value | Copied to called method; type statically known at both sides |
| | ByRef | Address sent to called method; type statically known at both sides |
| | RefAny | Address sent along with type information to called method |
| User-defined value class | By Value | Copied to called method; type statically known at both sides |
| | ByRef | Address sent to called method; type statically known at both sides |
| | RefAny | Address of reference sent along with type information to called method |
| Object class | By Value | Reference to data sent to called method; type statically known; class available from reference |
| | ByRef | Address of reference sent to called method; type statically known; class available from reference at both sides |
| | RefAny | Address of reference sent along to called method along with static type information; class available from reference |

FIG. 3

```
1    // Returning a pointer from a subsequent code frame
2    // when the contents of the pointer are allocated in
3    // the heap
4    void CurrentMethod ()
5    {
6         fooObject foo;
7         fooObject* pReturnfoo;
8
9         // Pointer to a fooObject is returned from
10        // MyMethod in subsequent code frame
11        pReturnfoo = MyMethod(&foo);
12   }

13   // MyMethod is defined in a subsequent code frame
14   fooObject* MyMethod(fooObject& pfooArg)
15   {
16        // pfoolnternal points to a fooObject allocated
17        // on the heap
18        fooObject* pfoolnternal = new fooObject();
19
20        // pfoolnternal is returned to the current
21        // code frame
22        return pfoolnternal;
23   }
```

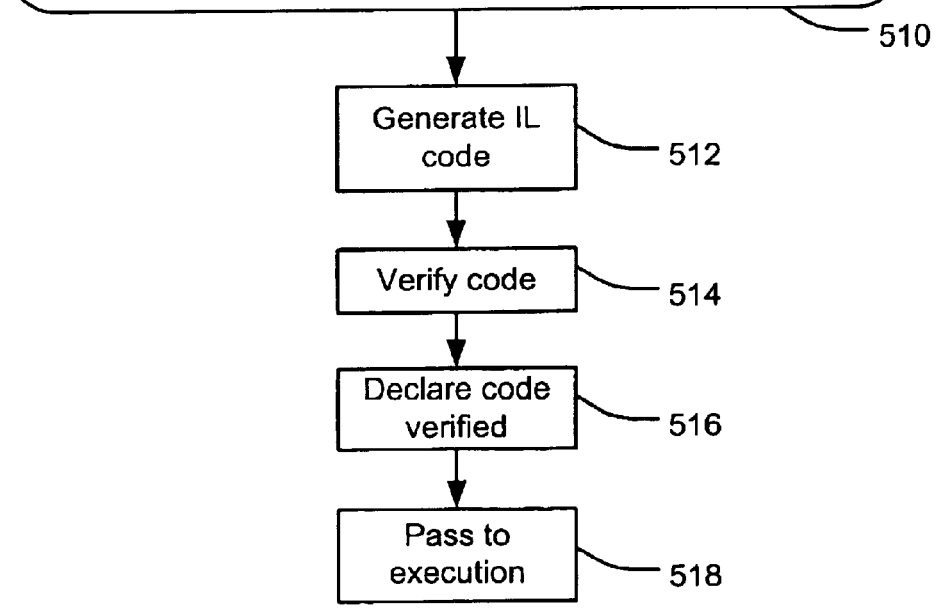

FIG. 5B

```
1    // Returning a pointer from a subsequent code frame
2    // when the contents of the pointer are allocated in the
3    // current code frame or a preceding code frame
4    void CurrentMethod ()
5    {
6        // foo is allocated in current code frame
7        fooObject foo;
8        fooObject& pReturnfoo;
9
10       // Pointer to a fooObject is returned from
11       // MyMethod in subsequent code frame
12       pReturnfoo = MyMethod(&foo);
13   }

14   // MyMethod is defined in a subsequent code frame
15   fooObject& MyMethod(fooObject& pfooArg)
16   {
17       // The argument pfooArg, which was allocated
18       // in the current code frame, is returned to the
19       // current code frame
20       return pfooArg;
21   }
```

— 520

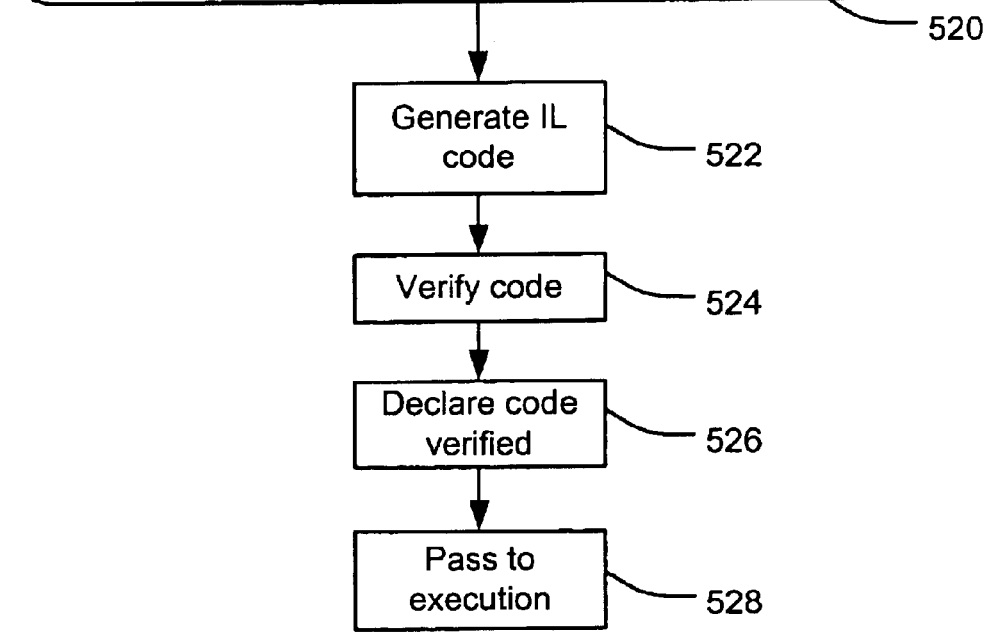

FIG. 5C

```
1   // Passing a value class by value to a subsequent code frame
2   // if elements of value class are not pointers
3   typedef struct {
4           fooObject foo;          // Is not a pointer
5           char bar;               // Is not a pointer
6   } InternStructType;
7
8   void CurrentMethod()
9   {
10          InternStructType MyReturnStruct1, MyArgStruct1;
11
12          // MyArgStruct1 can be passed into the subsequent code
13          // frame, and MyReturnStruct1 can be returned from
14          // subsequent code frame.
15          MyReturnStruct1 = MyMethod(MyArgStruct1);
16  }
```

— 600

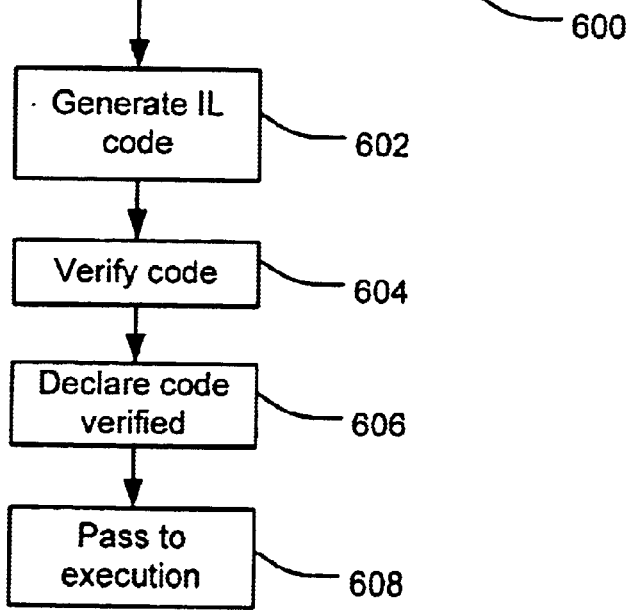

- Generate IL code — 602
- Verify code — 604
- Declare code verified — 606
- Pass to execution — 608

FIG. 6

```
1     // Reading and writing to contents of a nested pointer
2     // - a fooObject instance is allocated in a preceding code frame,
3     //   the address of which is passed into PrecedingMethod,
4     //   which is in a different preceding code frame
5     void PrecedingMethod (fooObject* pfoo)
6     {
7           // The address of pfoo, which is a pointer to the fooObject
8           // allocated in the preceding code frame, is passed to the
9           // current code frame in call to MyMethod
10          int i = CurrentMethod(&pfoo);
11    }

12    // CurrentMethod is defined in the current code frame
13    int CurrentMethod(fooObject** ppfoo)
14    {
15          // The argument ppfoo is a nested pointer
16          // Read access to the contents of ppfoo is verifiable
17          fooObject Currentfoo = **ppfoo;
18
19          // Write access to contents of *ppfoo is verifiable
20          **ppfoo = **ppfoo + Currentfoo;
21          int iValue = 5;
22          return iValue;
23    }
```

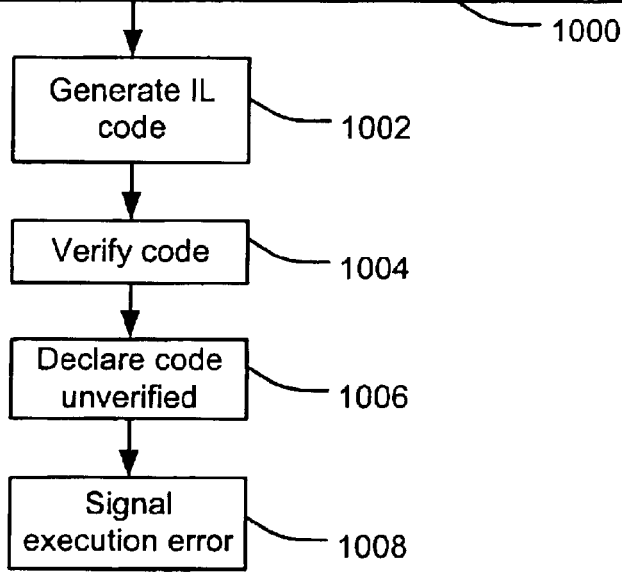

FIG. 10

```
1    // Writing a heap pointer to a component pointer of a nested pointer
2    // - a fooObject instance is allocated in a preceding code frame,
3    //   the address of which is passed into PrecedingMethod,
4    //   which is in a different preceding code frame
5    void PrecedingMethod (fooObject* pfoo)
6    {
7            // The address of pfoo, which is a pointer to the fooObject
8            // allocated in the preceding code frame, is passed to the
9            // current code frame in call to MyMethod
10           int i = CurrentMethod(&pfoo);
11   }

12   // CurrentMethod is defined in the current code frame
13   int CurrentMethod(fooObject** ppfoo)
14   {
15           // The argument ppfoo is a nested pointer
16           fooObject* pMyfoo = new fooObject(5);
17
18           // Write access to *ppfoo that causes ppfoo
19           // to point into the heap is verifiable
20           *ppfoo=pMyfoo;
21           int iValue = 5;
22           return *pMyInt;
23   }
```

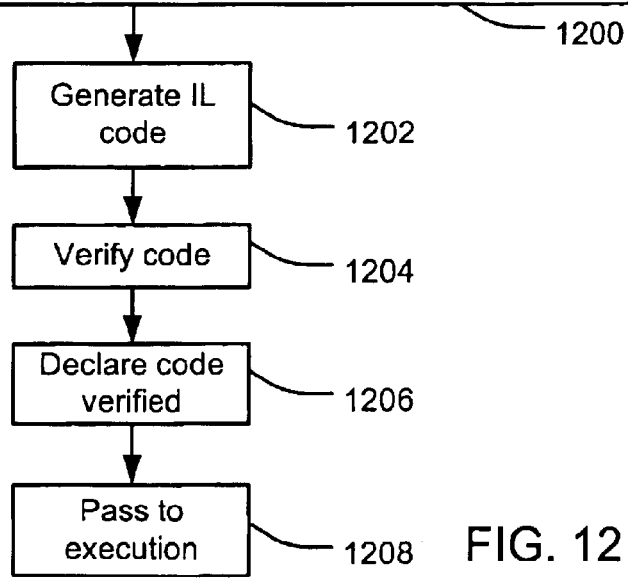

FIG. 12

```
1    // Writing a new pointer to a component pointer of a nested pointer
2    // - a fooObject instance foo is allocated in a preceding code frame,
3    //   the address of which is passed into CurrentMethod
5    void PrecedingMethod ()
6    {
7            // a fooObject instance is allocated in preceding code frame
8            fooObject foo;
9            // The address of pfoo is passed in call to MyMethod
10
11           int iReturnvalue = CurrentMethod(&foo);
12   }

13   // CurrentMethod is defined in the current code frame
14   int CurrentMethod(fooObject* pfoo)
15   {
16           // The argument pfoo is a pointer to foo
17           // Currentfoo is allocated in current code frame
18           fooObject Currentfoo;
19           fooObject* pCurrentfoo = &Currentfoo;
20
21           // ppfoo is a nested pointer to foo
22           fooObject** ppCurrentfoo = &pCurrentfoo;
23
24           // Write access *pCurrentfoo, which causes ppCurrentfoo to
25           // point to a memory location in preceding code frame, is
26           // verifiable
27           *ppCurrentfoo= pfoo;        // equals "pCurrentfoo=pfoo"
28           int iMyInt = 5;
29           return iMyInt;
30   }
```

1400

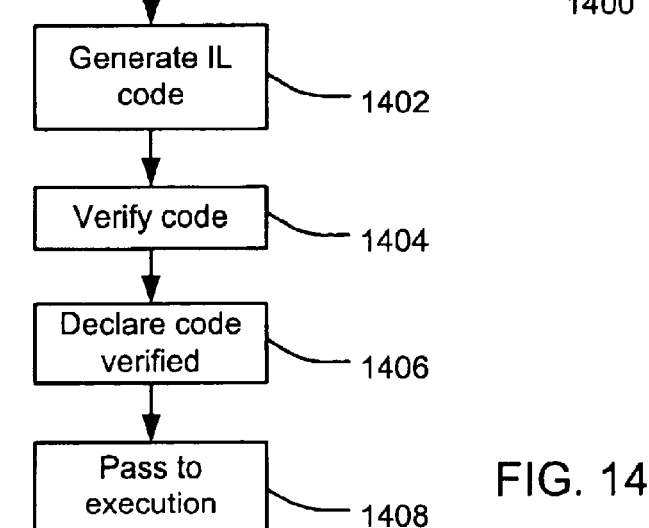

FIG. 14

VERIFYING INTERMEDIATE LANGUAGE CODE

CROSS-REFERENCE TO RELATED APPLICATIONS

The present application is a continuation-in-part of U.S. patent application Ser. No. 09/388,176 entitled VERIFIER TO CHECK INTERMEDIATE LANGUAGE, filed Sep. 1, 1999, assigned to the Assignee of the present invention, and incorporated herein by reference for all that it discloses and teaches.

TECHNICAL FIELD

The invention relates generally to computer security, and more particularly to verifying the type safety of an intermediate programming language.

BACKGROUND OF THE INVENTION

An intermediate language-type model can be used to support diverse source code programming languages for operation by an execution engine. Compilers may be developed to emit intermediate language code output from source code written in one or more programming languages. In some circumstances, the intermediate language code is directly interpreted by the execution engine within a run time environment. In other circumstances, the intermediate language code may also be compiled (e.g., by a Just-In-Time (JIT) compiler) to convert intermediate language code input into native (i.e., platform dependent) machine code for a given system. To support diverse high-level languages, an intermediate language may support a wide variety of high-level language constructs. An example of an intermediate language-type programming language includes the COM+ (Component Object Model Plus) intermediate language.

Executing software embodied in intermediate language code within an execution engine, however, presents the possibility of executing untrusted code (e.g., code for which the author has not been authenticated). Untrusted code may intentionally attack or inadvertently corrupt the runtime environment in which the code executes.

One opportunity for such attacks or corruption is presented by high-level language "typing" constructs, such as casting. Casting is a program action that converts a value or object from one type to another. For example, a variable of "floating-point" type may be cast to "integer" type. Each programming language has specific rules defining how a cast may occur. A programmer can perform a cast directly, or the language processor can perform the cast at processing time. Improper use of casting, however, may result in a program operation intended for a value having a first type being performed on a value having an incompatible type. In some cases, such improper use of casting may cause a program to crash or to otherwise corrupt the runtime environment.

Another approach for enforcing type safety has involved prohibiting the execution of certain high-level constructs, such as pointers, nested pointers, value classes, and RefAny's, that may introduce execution problems, such as type mismatches and dangling pointers. As such, existing approaches do not pass code containing such constructs for execution.

Attempts to prevent such typing problems have introduced a verification process that imposes strict typing rules on incoming program code and verifies that the received program code is "type safe", thereby preventing execution errors (or attacks) caused by type mismatches, dangling pointers, etc. Existing approaches for achieving type safety, however, have been unnecessarily restrictive, thereby limiting the support for various high-level language constructs in the original source code.

SUMMARY OF THE INVENTION

Embodiments of the present invention advance existing type checking techniques by providing and enforcing typing rules with finer granularity that in the prior art. As a result, intermediate language code satisfying the typing rules of the present invention can represent a wider variety of high-level language constructs over the prior art. A verification module evaluates a code frame relative to one or more verification conditions that ensure that the code frame is type safe. Exemplary verification conditions of the present invention may include without limitation conditions that test programmed operations passing and returning pointer parameters, passing and returning value classes by value, read and write accessing of nested pointers, read and write accessing of value classes containing pointers, and processing of RefAny parameters. If programmed operations in a current code frame satisfy a given set of one or more verification conditions, the verification module declares the code frame verified and passes the code frame to the runtime call stack for execution.

In an implementation of the present invention, a method of verifying a current code frame of intermediate language code for execution within a runtime call stack of a runtime environment is provided. A reference-based parameter is identified in the current code frame. The reference-based parameter references a memory location within the runtime environment. A programmed operation operating on the reference-based parameter is also identified within the current code frame. The current code frame is evaluated to determine whether the programmed operation on the reference-based parameter satisfies one or more verification conditions that ensure that the memory location referenced by the reference-based parameter will be valid when accessed during execution within the runtime call stack.

In another implementation of the present invention, a verification module for verifying a current code frame of intermediate language code received from a loader for execution within a runtime call stack of a runtime environment is provided. The intermediate language code is compiled from source code in one or more high level languages. A parameter identification module identifies a reference-based parameter in the current code frame. The reference-based parameter references a memory location within the runtime environment. An operation identification module identifies a programmed operation operating on the reference-based parameter within the current code frame. An evaluation module evaluates the current code frame to determine whether the programmed operation on the reference-based parameter satisfies one or more verification conditions that ensure that the memory location referenced by the reference-based parameter will be valid when accessed during execution within the runtime call stack.

In other implementations of the present invention, articles of manufacture are provided as computer program products. One embodiment of a computer program product provides a computer program storage medium readable by a computer system and encoding a computer program for executing a computer process that verifies a current code frame of intermediate language code for execution within a runtime call stack of a runtime environment. Another embodiment of a computer program product may be provided in a computer data signal embodied in a carrier wave by a computing system and encoding the computer program that verifies a current code frame of intermediate language code for execution within a runtime call stack of a runtime environment. The computer program product encodes a computer program for executing on a computer system a computer process for verifying a current code frame of intermediate language code for execution within a runtime call stack of a runtime environment. A reference-based parameter is identified in the current code frame. The reference-based parameter references a memory location within the runtime environment. A programmed operation operating on the reference-based parameter is also identified within the current code frame. The current code frame is evaluated to determine whether the programmed operation on the reference-based parameter satisfies one or more verification conditions that ensure that the memory location referenced by the reference-based parameter will be valid when accessed during execution within the runtime call stack.

These and various other features as well as other advantages, which characterize the present invention, will be apparent from a reading of the following detailed description and a review of the associated drawings.

BRIEF DESCRIPTION OF THE DRAWINGS

FIG. 3 depicts a runtime call stack including a current code frame in an embodiment of the present invention.

FIG. 5B illustrates operations for verifying intermediate language code that returns a heap pointer return parameter from a called code frame in an embodiment of the present invention.

FIG. 5C illustrates operations for verifying intermediate language code that returns a pointer return value into a current from a called code frame in an embodiment of the present invention.

FIG. 6 depicts operations for verifying intermediate language code passing and returning a user-defined value class by value in an embodiment of the present invention.

FIG. 10 illustrates operations for verifying intermediate language code that accesses contents of an exemplary nested pointer in an embodiment of the present invention.

FIG. 12 illustrates operations for verifying intermediate language code that write accesses a component pointer of a nested pointer using a heap pointer in an embodiment of the present invention.

FIG. 14 illustrates operations for verifying intermediate language code that write accesses a component pointer of a nested pointer using a pointer into a preceding code frame in an embodiment of the present invention.

DETAILED DESCRIPTION OF THE INVENTION

An embodiment of the present invention includes a verification module that evaluates intermediate language code to verify that the code is type safe before passing the code for execution. Code that is not deemed type safe can cause execution errors, corrupt the runtime environment in which the code is executing, or cause unauthorized access to protected system resources. As such, the verification module protects a computer system from intentional or inadvertent breaches of the computer system's defenses.

Improving over the prior art, a verification module of the present invention verifies the type safety of intermediate language code that supports significant high-level language constructs prohibited by verification modules in the prior art. In one embodiment, a verification module verifies intermediate language code that includes a reference-based parameter, such as a pointer (or reference), a value class containing pointers, a RefAny parameter, or a nested pointer. In another embodiment, value classes themselves may be passed by value into subsequent code frames of a runtime call stack and returned by value from subsequent code frames. In yet another embodiment, fields of value classes are verified to be initialized before they are read during execution. In yet another embodiment, built-in value types may be defined to support the native format of the built-in value types, so as to optimize performance on a given platform. These verification enhancements provide improved language support by the intermediate language while guaranteeing type safety.

Figure 2:
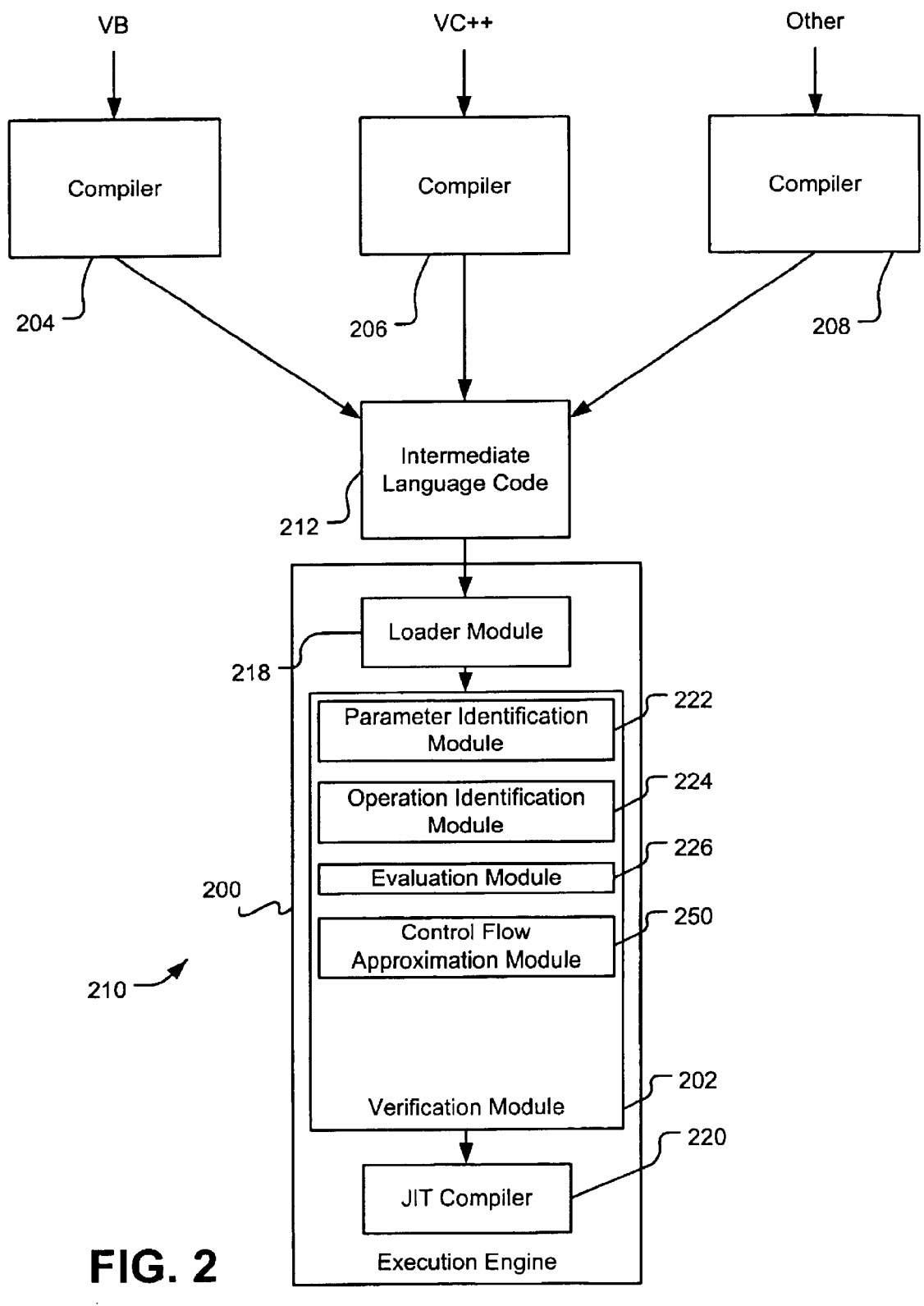
FIG. 2 illustrates a system including a verification module for an intermediate language code verification module in an embodiment of the invention.

Embodiments of the present invention may be implemented in a runtime environment (see FIG. 2). A computer system can initiate a runtime environment to execute a program, such as a downloaded application, and to manage security of the computer system. The runtime environment on the computer system may be initialized by a "trusted host", such as an operating system shell, a browser, an SQL server, or other code that is external to the runtime environment. The host, the loader or some other shared resource can initiate execution of the application by loading various code assemblies that constitute the application and passing the code assemblies to an execution engine for execution.

In an embodiment of the present invention, the execution engine provides a self-contained operating environment that performs much of the functionality of a separate computer. For example, an application can run in an execution engine without direct access to the host operating system. This design has at least two advantages:

System Independence: An application will run the same in any execution that supports the intermediate language in which the application is written, regardless of the hardware and software underlying the system. For example, the same application (i.e., the same programming code) can run in an execution engine on different computer systems having different types of microprocessors and different types of operating systems.

Security: Applications running in an execution engine are generally prevented from accessing protected system resources (i.e., the operating system, the file system, protected regions of memory, a connected network or peripheral). It should be understood, however, that an embodiment of the present invention can evaluate evidence and a security policy to determine whether to permit an application to access protected system resources. If permission for a given operation is granted, the application is considered "trusted" for that operation.

As the application components are loaded by the computer system 102, a verification module ensures that loaded code is properly formatted and does not violate the safety restrictions of the code language or the execution engine. Specifically, the safety restrictions that are to be enforced prevent potentially malicious code from accessing data other than through the well-defined interfaces of the code. It is important that verified code be unable to examine or modify the granted permission sets that are associated with the code assembly through mechanisms that are inaccessible to the code assembly (i.e., accessible only to the execution environment). Other verifications, such as verifying that internal stacks cannot overflow or underflow and that code instructions will have the correctly typed parameters, may also be performed. The code assemblies are then passed to a runtime call stack for execution.

Figure 1:
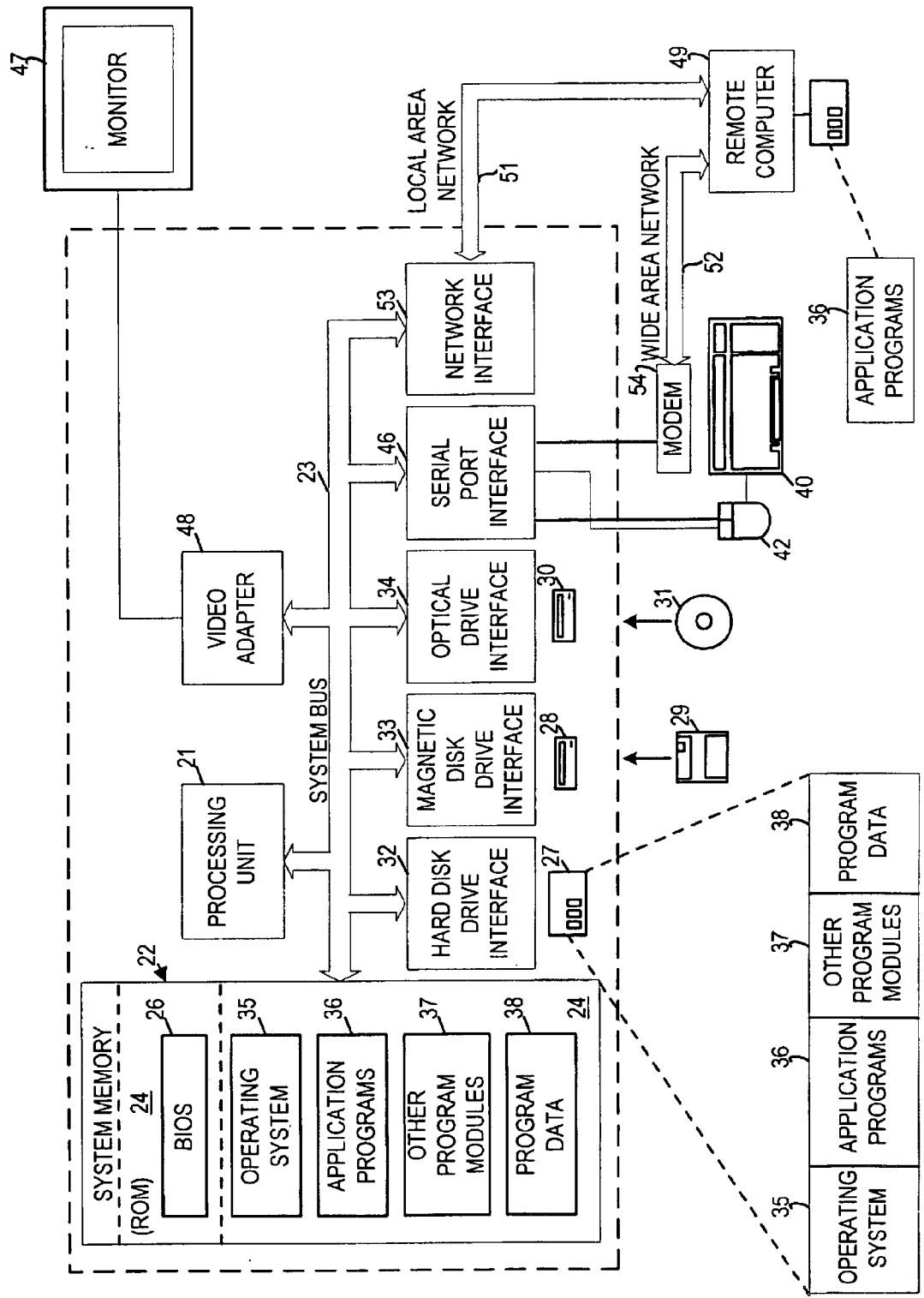
FIG. 1 illustrates an exemplary system useful for implementing an embodiment of the present invention.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and may include read only memory (ROM) 24, random access memory (RAM) 25, and registers. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a verification module may be incorporated as part of the operating system 35, application programs 36, or other program modules 37. Typing rules may be hard coded into the verification module or may be stored as program data 38. Generally, such typing rules are developed to ensure type safety of the intermediate language code so as to avoid execution errors during programmed operation.

FIG. 2 illustrates a system including a verification module 202 for intermediate language code in an embodiment of the invention. The system 210 includes an execution engine 200 having a verification module 202 and a loader module 218. It should be understood, however, that one or both of the verification module 202 and the loader module 218 may be implemented separately from the execution engine 200 in an alternative embodiment of the present invention. Modules within one embodiment of the verification module include without limitation: (1) a parameter identification module that identifies specific data types within the intermediate language code; (2) an operation identification module that identifies programmed operations operating on given data types within the intermediate language code; and (3) an evaluation module applying one or more verification conditions to determine whether a give programmed operation is type safe relative to an identified parameter. In addition, a control flow approximation module 250, which simulates execution relative to value and object types based on information from the other modules, may also be included within a verification module.

The illustrated embodiment shows compilers 204, 206, and 208 receiving source code prepared in various source code languages and converting the received source code into intermediate language code. The compiler 204 is shown as compiling Visual Basic (VB) source code. The compiler 206 is shown as compiling Visual C++ (VC++) source code. The compile 208 is shown as compiling source code of some other source code language (e.g., C, C#, Jscript, APL, COBOL, Eiffel, Perl, Python, and Scheme). The source code languages referenced herein are provided only as examples and are not intended to limit the possible source code languages supported within the scope of the present invention.

The exemplary compilers 204, 206, and 208 are shown to emit intermediate language code into a common intermediate language code set 212; however, in alternative embodiments, a single compiler may emit all necessary code for a given intermediate language code set, without including intermediate language code from another compiler. In addition, the intermediate language code required to implement a given operation may be generated as multiple intermediate language code sets generated by a single compiler or by multiple compilers.

The intermediate language code set 212 may include metadata that provides relevant information regarding instructions of each method in the intermediate language code. In an embodiment of the present invention, metadata may include information regarding:

A signature of the method—specifies the return type, the number of arguments, the order, parameter passing convention, primitive data type of each argument, and the native calling convention An exception handling array—holds information delineating the ranges over which exceptions are filtered and caught A maximum operation stack depth—the size of the evaluation stack within the current stack frame A "zero init flag"—indicates whether the local variables and memory pool should be initialized by the execution engine A "type" of each local variable—in the form of a signature of the local variable array (called the "locals signature").

In alternative embodiments, metadata may include a different combination of information describing type characteristics of variables within the intermediate language code.

In addition, metadata can indicate the degree of portability of the intermediate language code. In one embodiment of the present invention, portability restrictions may include:

Restriction to a specific (32-bit or 64-bit) natural size for integers.

Restriction to a specific "endian-ness" (i.e. whether bytes are stored left-to-right or right-to-left within a machine word).

In alternative embodiments, additional restrictions may also be applied within the scope of the present invention. By stating what restrictions are placed on executing the code, the loader module 218 can prevent non-portable code from running in an architecture the code cannot support.

In one embodiment, the exemplary compilers 204, 206, and 208 can emit intermediate language code that conforms to certain typing rules. Typing rules, such as those disclosed with regard to the present invention, are developed both to ensure type safe code and to allow type safety to be proven by examination of the resulting intermediate language code (i.e., by verification). A compliant compiler can enforce typing rules for each intermediate language code set that the compiler generates. Still, in some situations, such as after downloading untrusted code from a network, we cannot determine that a code set was in fact generated by a compliant compiler, and therefore typing rules must be enforced at runtime. As such, a verification module 202 precedes the execution portion of the execution engine 200 to further ensure type safety before code is executed.

In FIG. 2, the loader module 218 retrieves elements of the intermediate language code 212 and passes the elements to the verification module 202. For example, the class loader 218 can load the implementation of a class into memory, check that the class is consistent with assumptions made about it by other previously loaded classes, and prepares the class for execution. To accomplish this task, the loader module 218 ensures that certain information is known, including the amount and the shape of the memory required by instances of the type (e.g., class). In addition, the loader module 218 determines whether references made by the loaded type are available at runtime and whether references to the loaded type are consistent. In one embodiment of the present invention, the loader module 218 checks for certain consistency requirements that are vital to the system's security enforcement mechanism. These checks constitute a minimal, mandatory, verification process that precedes the verification module 202, which is more rigorous. In addition, the loader module 218 supports security enforcement by providing some of the credentials required for validating code identity.

The verification module 202 verifies the intermediate language code 212 by examining the intermediate language code 212 and only permitting execution of the code that the verification module 202 can demonstrate will not make unsafe memory references or accesses. Processing by the verification module 202 is optional in the sense that verification of trusted code is not required. Type safe programs reference only memory that has been allocated for their use. In addition, type safe programs access objects only through their public interfaces. These restrictions allow objects to safely share a single address space and guarantee that security checks provided by the objects' interfaces are not circumvented. Code access security, a system's security mechanism, can effectively protect against unauthorized access, if there is a way to verify that the code is type safe.

To meet this need, the system provides the verification module 202 that can use the information in metadata (e.g., method signatures) and, by applying given typing rules, determine whether intermediate language code is type safe. The verification module 202 checks to see that metadata is well-formed and performs control flow analyses to ensure that certain syntactic and semantic conditions are met. The verification module 202 declares that a given set of intermediate language code is successfully verified only if the code is determined to be type safe (i.e., compliant with given verification conditions).

In an embodiment of the present invention, the verification process includes a first verification pass that determines the location of basic blocks of one or more instructions of intermediate language code. The first verification pass can also ensure that all branch destinations are proper (e.g., branches do not jump outside a program's allotted memory area) and are on instruction boundaries (i.e., not offset within a given instruction). A second verification pass performs other assorted verification operations, some of which are dependent on the specific instruction to be verified. While a two-pass verification process is disclosed herein, it should be understood that the verification operations of the present invention are not limited to a two-pass verification module or to any particular pass of a verification process.

The execution engine 200 interprets the intermediate language code for execution, or alternatively "just-in-time" compiles the intermediate language code into executable code, such as native code for a particular platform. The interpreted code or the executable code can be executed by the execution engine 200.

Each of the compilers 204, the verification module 202, and the execution engine 200 can in one embodiment be a computer program executed by a processor from a computer-readable medium, such as a memory. Each of the multiple source code language sources, the intermediate language code, and the executable code can in one embodiment be stored as data in a computer-readable medium, such as a memory or a hard disk drive. The typing rules applied by the verification module 202 in one embodiment is described in more detail later in the detailed description.

The verification module 202 in one embodiment simulates method execution by pushing and popping the appropriate types as instructions are evaluated, as can be appreciated by those of ordinary skill within the art. Loads from and stores into local variables, arguments, and fields are checked for type safety, as are the arguments to and return values from method calls.

The verification module 202 can performs the semantic checks by simulating the effect of executing the instructions in the method. The types of values that are tracked may be assumed by the arguments, stack slots, and local variables over the course of any execution path through the method to check that no instruction can give rise to a type error. An instruction or set of instructions can constitute a programmed operation.

An important aspect of the semantic checks includes type checking using type states. During verification, types states may be tracked through the simulated operation of the received intermediate code. In an embodiment of the present invention, a type state is a structure that provides a type for one or more values in the current code frame. A type state records constraints on the types of arguments, locals and stack slots. A type state can include without limitation the following information:

args. An array of types, one for each argument to the method. In an embodiment of the present invention, the type of each argument is fixed throughout the method, except that in a constructor, argument 0 (the first argument in the argument array) starts as the type "UnconThis", but after initialization it becomes either "&(VC(this))" (i.e., the address of the this pointer of a value class) for a value class this constructor, or "O(this)" for a object class this that is not a value class.

locals—an array of types, one of each for each local variable stack—an array of types indicating the current state of the evaluation stack fields—flags used to indicate which fields a value class constructor has initialized block—flags recording if what kind of code block is being verified tailcall-ok—flag recording whether it is safe to perform a tail call.

In one embodiment, the semantic checks can be expressed as an algorithm. It should be understood that alternative algorithms having differing set of states and operation flows may be employed within the scope of the present invention. In one exemplary algorithm, the following states may exist:

Pending Nodes: a set of pairs (i, state), where i is an address and state is a type state. This set stores those locations still to be explored in the data flow analysis of the method.

Visited Nodes: as addresses are analyzed, the results of the analysis are recorded, and thus each address is either unmarked, or marked with a type state.

In one embodiment, a verification process is implemented by a parameter identification module (PIM), an operation identification module (OIM), and an evaluating module (EM). A control flow approximation module (CFAM) may also be used in this embodiment to simulate execution in accordance with types based on information passed from other modules. The PIM identifies the types (e.g., argument types and local variable types) specified in the metadata for a given method (i.e., $arg_1', \ldots arg_n'$). Given these arguments, the operation identification module (OIM) applies the initial rules at the start of the method. For example, the OIM may identify the construction of an initial stack frame for that method (normally caused by a method call instruction). Identification of instructions is also performed by the OIM. Any access of information about the method (e.g. "if verifying a value class constructor") is communicated to the PIM to assist in parameter identification and initialization.

Computations of the least upper bounds and any decisions that result in failure belong to the EM, which also performs computations required to determine "the effect of an instruction on the type state". The EM may also determine the destinations of a given operation (e.g., a method call) in terms of a control-glow graph through the instruction sequence. That is, in one embodiment, part of the EM's operation is to determine how instructions are chained together and whether this chaining is valid.

The following embodiments show the iterative computation of types states using rules that check whether particular operations are valid, and determine what is the type state at the destination addresses of an instruction. The rules can also be used within embodiments for systems that have simple or complex control flow. A simple control flow may involve a simple case of an instruction set and execution engine without exceptions and with a linear control flow. Systems with more complex control flows may include, for example, (a) a system with local variables, which may require a richer type state to track not only the argument types and stack, but also the local variable types; (b) a system with branching, such as described in the previous embodiment; (c) a system with different types of methods, which can involve different kinds of initial type states; (d) a system with exceptions, which can require approximation of the possible effect of exceptions on the control flow; and a system with tail-calling, where, as for local variables, the type state may include a "tailcall-ok" flag.

An exemplary embodiment may include the following operations, accompanied by the module that performs the operation underlined in parentheses:

1. Initialize Pending to be the singleton set $\{(0, state0)\}$ where state0 has (OIM):
   (a) args=
   [arg1', ..., argn'], if the method is static (OIM), with
   [UnconThis, $arg_1'$, ..., $arg_n'$], if the method is a constructor (OIM); and
   [O(td), $arg_1'$, ..., $arg_n'$], otherwise (OIM).
   (Here the signature of the method is class::method ($arg_1, \ldots, arg_n$) with $arg_i'$ being $arg_i$ with &(ty) types replaced by &*(ty). (PIM))
   (b) locals=
   [$loc_1$, ..., $loc_n$], if the ZeroInit flag is true (OIM);
   [Uninit($loc_1$), ..., Uninit($loc_n$)], if the ZeroInit flag is false (OIM);
   (Here the tailsig of the method is [$loc_1$, ..., $loc_n$]. (PIM))
   (c) stack=[ ] (OIM)
   (d) fields=
   [false, ..., false] if verifying a value class constructor, one for each field (OIM);
   undefined, otherwise (OIM).
   (e) block=regular (OIM)
   (f) tailcall-ok=true (OIM)
2. If Pending is the empty set, halt with success (EM).
3. Choose a pair (i, state) from the set Pending, and remove it from the set (CFAM).
4. If the address i is marked with the state old (CFAM):
   If the least upper bound old ∪ state exists, then (CFAM, EM):
   If old ∪ state equals old, goto operation 2 (CFAM, EM).
   Otherwise, unmark the address i, insert (i, old ∪ state) into Pending, and goto operation 2 (CFAM, EM).
   Otherwise, halt with failure (EM).
5. If the address i is unmarked (CFAM, EM):
   Mark the address i with the state state (CFAM).
   Let inst be the IL instruction whose first byte is at address i (OIM).
   The effect an instruction has on the type state as has been defined (EM). If any of the checks described there fail, then halt with failure (EM). Otherwise, let state' be the effect of the instruction inst on state (EM).
   If the length of the stack component of state' is greater than MaxStack, halt with failure (EM).
   Insert one element (j.state') into Pending for each destination address j specified in the detailed description below (EM). In addition, for each exception clause with Start, End, Handler, and Finally offsets, where Start <=i<=End, and a class token Class, we insert (Handler, state") and (Finally, state") into Pending, where state" is state with the stack set to [Class] (EM). If the exception clause has a Filter offset, then insert (Filter, state") where state" is state' with the stack set to [Microsoft/Runtime/Object] (EM)
   Goto operation 2.

A simpler system may be verified with the following operations:
1. Set the type state s to be "args=[$arg_1'$, ..., $arg_n'$], stack==[ ]" (OIM), where the OIM determines $arg_1'$, ..., $arg_n'$ to be the best verification types to assign to the arguments of the method given that the PIM determines that the method signatures is method($arg_1$, ..., $arg_n$).
2. For each instruction i in the linear sequence $i_1, i_2, \ldots, i_n$ do the following:
   a) The OIM determines that the next operations is i. The EM checks if the instruction i is valid given type state s. If not, fail.
   b) The EM computes the next type state s' and the algorithm assigns s' to s.
3. After processing all instructions, terminate with success.

It should be understood that the algorithms and rules described herein comprise exemplary embodiments of the present invention. Modifications and enhancements to the disclosed embodiments can be accomplished within the scope of the present invention.

The preceding discussion relates to tracking type states in an embodiment of the present invention. These operations may be used in combination with an understanding of the effect of an instruction on a type state. For example, if an instruction loads the address of a local variable of type T, then the EM determines that the effect of the instruction on the type state S is to produce a new type state S'. The new type state S' is equivalent to the old type state S, except that S' indicates that the stack contains an extra value "v" of type "&T" and that "v" is always known to refer into the current stack frame. Accordingly, by tracking the type state in accordance with an understanding of the effect of an instruction on the type state, type safety can be verified with a finer degree of granularity than in previous approaches.

In an alternative example, if an instruction is a call to a method (e.g., "void Method(pfoo)"), where a pointer value "pfoo" is passed through a method having a signature "void Method(&T)" in a subsequent code frame, then the EM performs a computation to determine the effect of the calling instruction. Namely, the EM that the effect of the instruction on the type state is only defined if, according to the recorded type state, "pfoo" is known to reference the current stack frame and is known to have a type compatible with the expected type "&T".

It should be understood that there are many realizations of "the effect of an instruction on a type state", primarily because there are many possible instructions (including instructions that combine several primitive actions). The combinations of type state tracking and verification conditions can be implemented to achieve an arbitrary level of type checking granularity, depending on the resource and performance constraints of a given system.

In one embodiment of present invention, a verification module can track type states to a certain level of granularity, which may be controlled by the information that can be determined from the knowledge they value has a particular type. Such information include, for example, determination of whether a value is a value class, determination of whether a value is a pointer that references a heap, or determination of whether a value is a pointer that references the given stack frame.

The "effect of an instruction on the type state" can be defined as the best approximation that can be statistically given the current type state and all the possible manipulations to the type state that may be performed by the given execution states of the instruction. Furthermore, the "effect" may be indeterminate if certain preconditions for the instruction are not met (i.e., if one or more of the possible manipulations that may result from operation of the instruction represents a computation that is outside the manipulations allowed by the verification module, in which case, a type check error may be signaled. To support additional verification conditions (i.e., to type check additional language constructs), additional tracking information may be added to the type state and/or a more precise understanding of the effect of an instruction on the type state may be incorporated into the verification module.

FIG. 3 lists exemplary methods of passing data from a current code frame to a subsequent code frame in an embodiment of the present invention. The execution engine supports various parameter-passing conventions. For each parameter of a method, the parameter passing convention to be used is indicated in metadata as part of the signature of the method. Each parameter to a method can have its own passing convention, so that different parameters to a method may be passed in accordance with a different convention (e.g., the first parameter may be passed by value while all others may be passed by reference).

The execution engine supports aggregate data, that is, data items that have sub-components (arrays, structures, or instances) but are passed by value (i.e., copying the aggregate data to a called method). The sub-components can include references to managed memory. Aggregate data is representing using a "value class", which can be instantiated in two different ways:

Boxed: as an Object, carrying full type information at runtime, and typically allocated on the heap by the runtime memory manager.

Unboxed: as a "value class instance" which does not carry type information at runtime and which is not allocated directly on the heap. An unboxed value can be part of a larger structure on the heap —a field of a boxed class instance or an element of an array. Alternatively, an unboxed value can be on the stack as an argument or local variable. In another alternative, an unboxed value can be allocated as a static variable or static member of a class.

The table in FIG. 3 illustrates how different parameter passing conventions are applied to different types of data. The parameter passing conventions described herein include passing a parameter by value ("By Value"), passing a parameter by reference ("By Ref"), and passing a value by "RefAny". Passing a parameter by reference may also be described as passing a managed or unmanaged pointer to a parameter into the method as an argument. A RefAny involves passing a combination of a pointer to a value (e.g., a pointer) and type information.

Built-in value types, such as int, float, etc., and user-defined value classes (e.g., a "struct", array in C Language) may be passed to a called method By Value, ByRef, or by RefAny. ByRef parameters are substantially equivalent of C++ reference parameters, C pointer parameters, or PASCAL var parameters: instead of passing as an argument the value of a variable, field, or array element, the address of the memory location containing the variable, field, or array element is passed as an argument instead; and any assignment to the corresponding parameter actually modifies the corresponding variable, field, or array element. Much of this work is done by the higher-level language, which hides from the user the need to compute addresses to pass a value and to use indirection to reference or update values.

ByRef parameters and value classes are sufficient to support statically typed languages (C#, C++, Pascal, etc.). ByRef parameters and value classes also support dynamically typed languages that pay a performance penalty to box value classes before passing them to polymorphic methods (Lisp, Scheme, SmallTalk, etc.). Unfortunately, ByRef parameters and value classes are not sufficient to support languages like Visual Basic that require ByRef passing of unboxed data to methods that are not statically restricted as to the type of data they accept. Such languages require a way of passing both the address of the referenced memory location of the data and the static type of the parameter, which is equivalent to the information that would be provided if the data were boxed, but without the heap allocation required of a "box" operation.

RefAny parameters address this requirement. A RefAny parameter is very similar to a standard ByRef parameter except that the static data type is passed as well as the address of the data. Like ByRef parameters, the argument corresponding to a RefAny parameter contains the address of a memory location containing the referenced parameter. If it were not for the fact that the verifier and the memory manager must be aware of the data type and the corresponding address, a RefAny parameter could be implemented as a standard value class with two fields: the address of the data and the type of the data. However, a RefAny parameter is a designated type of its own within an embodiment of the present invention. Like a regular ByRef parameter, a RefAny parameter can refer to a memory location that is on the runtime call stack, and that memory location will have a lifetime limited by the call stack. Thus, the intermediate language generator performs appropriate checks on the lifetime of ByRef parameters; and the verifier imposes the same restrictions on the use of RefAny parameters as it does on ByRef parameters.

When a built-in value type or user-defined value class parameter is passed By Value, the value of the parameter is copied to the called method. The type associated with the value is defined statically in the calling code frame (e.g., based on the declaration of the parameter) and in the called code frame (e.g., in the signature of the method). When a built-in value type or user-defined value class parameter is passed ByRef, the address of the parameter is sent to the called code frame. The type associated with the value referenced by the address is defined statically in the calling code frame and in the called code frame. When a built-in value type or user-defined value class parameter is passed by RefAny, an address of the parameter and associated type information are passed to the called code frame. The type associated with the parameter referenced by the address is defined statically in the calling code frame and the called code frame by the associated type information.

An object class parameter may also be passed By Value, ByRef, or by RefAny. When an object class parameter is passed By Value, an address to the object class parameter is sent to the called code frame. The type associated with the parameter referenced by the address is defined statically in the calling code frame and in the called code frame. When an object class parameter is passed ByRef, an address of reference to the object class parameter is sent to the called code frame. The type associated with the parameter is defined statically in the calling code frame and in the called code frame. In addition, the class associated with the parameter is available through the reference. In an embodiment of the present invention, each object carries information about its class. The class of an object can be obtained by extracting the address of the object reference from the ByRef (or RefAny) and de-referencing this address, to obtain the object reference.

When an object class parameter is passed by RefAny, an address to a pointer/type information pair is sent to the called code frame. The pointer references a reference to the object class instance, and the type information indicates the type of the object class instance. The class of the instance is also available through the reference. Consider a RefAny of the pair (obj-ptr, type), wherein obj-ptr points to a slot containing an object reference that always refers to an object obj compatible with type type. When a new object obj' is stored via obj-ptr in the RefAny, the system verifies that the statically determined type of obj' is compatible with type. This approach applies to all RefAny's, such as a RefAny that is the pair (int-ptr, INT), where int-ptr points to an integer value. When a new value value is stored via the int-ptr in the RefAny, the system verifies that the statically determine type of the value is compatible with the type in the RefAny (i.e., INT).

In one embodiment of the present invention, the verification module checks that the types of parameters match the types of values passed, but is otherwise unaware of the details of the calling convention. However, some addresses (e.g., of local variables and arguments) have lifetimes tied to the method contexts. These addresses cannot be validly referenced outside their lifetimes, and so the addresses should not be stored or accessed in program locations that exist beyond the lifetime of the address.

Figure 4:
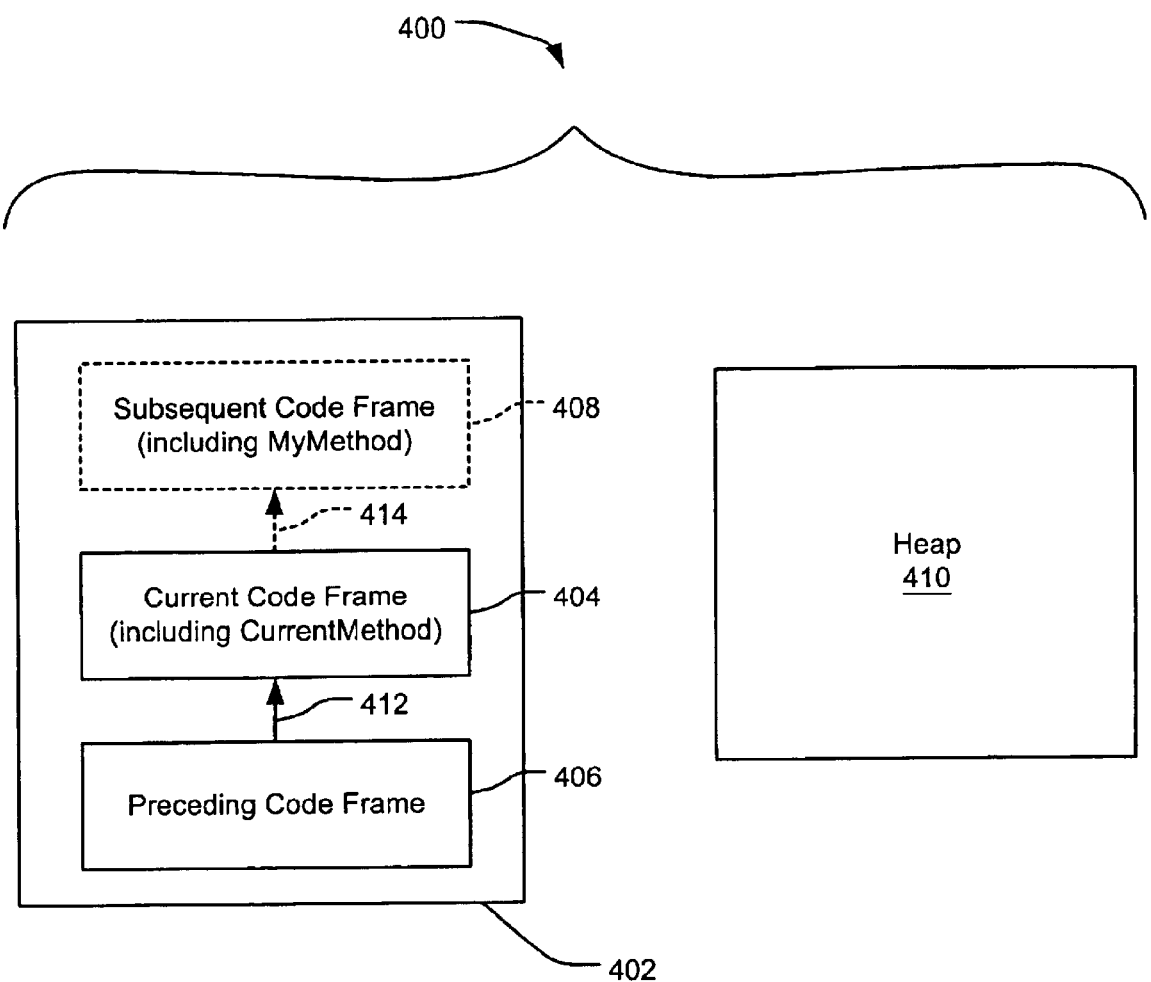
FIG. 4 depicts a runtime call stack including a current code frame in an embodiment of the present invention.

FIG. 4 depicts a runtime call stack including a current code frame in an embodiment of the present invention. The elements 400 represent memory regions within a runtime environment on a computer system. In programming, a heap includes an area of memory that is reserved for data allocated at runtime. In addition, memory locations may be statically allocated in a global memory pool (not shown) at compile time. In contrast, the stack is an area of memory used for data whose size can be determined when the program is loaded on the runtime call stack. A code frame includes data belonging to one particular scope (e.g. a method body). Code frames are usually created (on the runtime call stack) upon entry into a method and removed upon exit from the method. When a code frame is removed from the runtime call stack, the memory locations within the code frame are no longer valid for referencing or accessing by other code frames. The period of time that a memory location is valid is referred to as its "lifetime". Memory locations allocated in the heap or the global memory pool are assumed to have lifetimes that exceed all code frames in the stack.

Runtime call stack 402 includes a current code frame 404, which represents a code frame that would be considered a currently executing code frame in the runtime call stack. A preceding code frame 406 represents a code frame that includes instructions for calling a method of the current code frame 404. The direction of the call from one code frame to another is represented by the arrows 412 and 414; however, there may also be a return from the call in the opposite direction. In contrast, a subsequent code frame 408 represents a code frame containing a method to be called by the current code frame 404. As indicated by the dotted box representing the subsequent code frame 408, the subsequent code frame 408 has not yet been executed (or has already been executed and removed from the stack), as the current code frame 404 is simulated as currently executing in preparation of calling the subsequent code frame 408. The heap 410 represents an area of memory reserved for dynamic allocation of data by the code frames of the runtime call stack 402. It should be understood that the runtime call stack 402 merely represents an exemplary call stack and that embodiments of the present invention may have more code frames or fewer code frames, in accordance with a program's runtime characteristics.

Although the code frames of FIG. 4 are illustrated as being located in the runtime call stack, it should be understood that the verification process occurs before each code frame is actually loaded into the runtime call stack. During the verification process, execution of each code frame is merely simulated, not actually performed. As such, the code frames of FIG. 4 are illustrated within the runtime call stack merely to provide a reference to their relative execution dependencies.

Figure 5A:
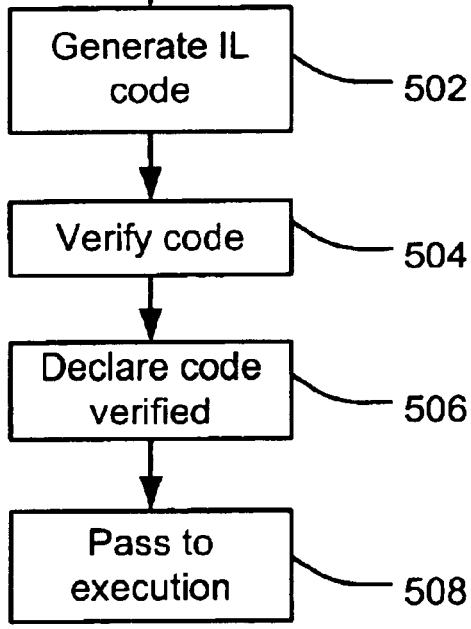
FIG. 5A illustrates operations for verifying intermediate language code that passes a pointer parameter into a called code frame in an embodiment of the present invention.

FIG. 5A illustrates operations for verifying intermediate language code that passes a pointer parameter into a called code frame in an embodiment of the present invention. In the illustrated embodiment, the source code of receiving operation 500 passes an argument by reference (using a pointer parameter) into a subsequent code frame. Because the address of the memory location referenced by the pointer parameter is allocated in the current code frame and has a lifetime greater than the subsequent code frame's lifetime, the current code frame may be verified as type safe and be loaded into the runtime call stack for execution by the execution engine. In addition, if the method call is not a tail call, any valid pointer parameter passed into a subsequent code frame is guaranteed to remain valid during the execution of the programmed operation of passing the pointer parameter to the subsequent code frame. As such, passing a pointer parameter in a method call to a subsequent code frame satisfies verification conditions that ensure type safety in an embodiment of the present invention. However, if the method call is a tail call, additional verification conditions may apply (e.g., see the descriptions of FIGS. 7, 8A, 8B, and 8C). Likewise, if a pointer parameter is returned by the method call, additional verification conditions may also apply (e.g., see the descriptions of FIGS. 5B, 5C, and 5D).

The description of FIG. 5A generally includes references to the elements of FIG. 4. Receiving operation 500 inputs the indicated exemplary source code into a compiler. A C++ Language syntax is employed in the descriptions of embodiments of the present invention. However, support for other source code languages are also included within the scope of the present invention.

The source code includes a method on line 2 called CurrentMethod, which is to be executed within the current code frame of FIG. 4. On line 5, an object foo is allocated (i.e., by the compiler) within the memory of the current code frame. On line 10, the current code frame calls a method MyMethod in the subsequent code frame, passing the address of the object foo as an argument (as indicated by the expression "&foo"). In this embodiment, the argument foo is passed by reference (as a ByRef) to the subsequent code frame as a pointer parameter (also, a reference-based parameter). The call to MyMethod represents a programmed operation that executes within the runtime call stack and invokes the loading, optional verification, and execution of a subsequent code frame containing MyMethod.

In operation 502, the source code is compiled into intermediate language (IL) code. It should also be understood that the source code illustrated in FIG. 5 (and in other figures herein) is used merely to illustrate the characteristics of a given set of code frames. The verification of a code frame, however, is intimately dependent upon the intermediate language code that results from compilation of the source code. That is, a compiler can be constructed that produces unverifiable intermediate language code from the illustrated source code. Accordingly, it should be assumed that the illustrated source code is compiled into intermediate language code that comports with the source code, the textual descriptions of the intermediate language code and resulting code frames, and the typing rules discussed with regard to that source code.

In operation 504, the intermediate language code is verified by a verification module. In the illustrated embodiment, the verification module identifies the call to MyMethod in the intermediate language code of the current code frame. The verification module then determines, based on metadata and other typing information, the argument types and return type of the call to MyMethod. To determine whether to declare the intermediate language code verified, the verification module determines, among other conditions, whether the address of foo will remain valid during the execution of the subsequent code frame. Accordingly, the verification module tracks the allocation of each variable in the program, allowing the verification module to determine whether the address of the argument will remain valid during the execution of the programmed operation (i.e., the method call).

Unless the method call is a "tail call" (see description of FIG. 7), the lifetime of a current code frame is necessarily at least as great as the lifetime of a subsequent code frame. Accordingly, in FIG. 5A, determining that the memory location of foo is allocated within the current code frame guarantees that the address of foo will remain valid during execution of the method call (i.e., the programmed operation associated with the referenced-based parameter &foo, which is a pointer parameter) to MyMethod in the subsequent code frame; therefore, the code is verifiable.

Although the embodiment in FIG. 5A involves a data element allocated in the current code frame, it should be understood that the relevant verification condition disclosed relates to the validity of the argument during the execution of the subsequent code frame. As such, static allocation in any preceding code frame (which would have a lifetime that is at least as great as the lifetime of the current code frame and the subsequent code frame) and dynamic allocation on the heap (which would also have a lifetime that is at least as great as the lifetime of the subsequent code frame) would also satisfy the verification condition and resulting in verifiable code. In this embodiment of the present invention, the safety of the rules for heap pointers relies upon management of the heap by garbage collection, such that a programmer cannot explicitly deallocate allocated heap memory. However, additional typing rules may be employed to verify the safety of heap pointer management in systems that allow programmer-controlled memory deallocation.

If the verification condition is satisfied, declaring operation 506 declares that the code is verified. One method of performing this declaration is to signal to the execution engine or runtime environment a status indicating that verification was successful. An alternative method of declaring the code as verified is to refrain from signaling a verification exception, which is an exemplary type check error. (If a code frame fails verification, a verification exception may be thrown to invoke error handling code, allowing the runtime environment to recover from the error. A common response is to terminate execution of the program and to notify the user that the executing program failed verification.) If the code is declared verified, passing operation 508 passes the code frame into the runtime call stack for execution. Alternative type check error signals are contemplated within the scope of the present invention, including directly calling to an error handling function within the runtime environment, setting flag indicating a type check error, and invoking an interrupt or an event for error handling purposes.

In the exemplary embodiments of the present invention described herein, the operations for verifying intermediate language code are represented in relation to a specific verification condition or set of verification conditions discussed with regard to a given embodiment of the present invention. It should be understood, however, that additional verification conditions may also be applied in an alternative embodiment of the present invention. In this alternative embodiment, a verification module described and claimed herein may declare a given intermediate language code set as verified and pass the code for execution relative to one or more specific verification conditions. Of course, if the intermediate language code fails other verification conditions, verification and execution may ultimately be precluded.

FIG. 5B illustrates operations for verifying intermediate language code that returns a heap pointer return parameter (which is a pointer return parameter that points into the heap) from a called code frame in an embodiment of the present invention. In the illustrated embodiment, the source code of receiving operation 510 returns a heap pointer return parameter from a subsequent code frame. Because the address the return value is allocated on the heap, which has a lifetime greater than the subsequent code frame's lifetime, the intermediate language code frame may be verified as type safe and be loaded into the runtime call stack for execution by the execution engine.

Receiving operation 510 inputs the indicated exemplary source code into a compiler. The source code includes a method on line 4 called CurrentMethod, which is a programmed operation to be executed within the current code frame of FIG. 4. On line 11, the current code frame calls a method MyMethod in the subsequent code frame, such that the return of pReturnfoo is part of the programmed operation. On line 18 within MyMethod, a fooObject instance is dynamically allocated on the heap and will have a lifetime that is at least as great as the lifetime of the subsequent code frames and the programmed operation (i.e., the method call) in the current frame. On line 22, the heap pointer return parameter (i.e., referred to as a reference-based parameter) is returned to the current code frame from the subsequent code frame.

In operation 512, the source code is compiled into intermediate language (IL) code. In operation 514, the intermediate language code is verified by a verification module. In the illustrated embodiment, the verification module identifies the call to MyMethod in the intermediate language code of the current code frame. The verification module then determines, based on metadata and other typing information, the argument types and return type of the call to MyMethod. To determine whether to declare the intermediate language code verified, the verification module determines, among other conditions, whether the address of the return value will remain valid during the execution of the current code frame. In this embodiment, the lifetime of the heap pointer is guaranteed to be at least as great as the lifetime of the subsequent code frame and the current code frame; therefore, the code is verifiable. Operations 516 and 518 are substantially equivalent to operation 506 and 508 in FIG. 5A.

FIG. 5C illustrates operations for verifying intermediate language code that returns a pointer return parameter into a current or preceding code frame from a called code frame in an embodiment of the present invention. In the illustrated embodiment, the source code of receiving operation 510 includes a programmed operation that returns a pointer return parameter from a subsequent code frame. Because the memory location referenced by the of the pointer return parameter is allocated in the current code frame, which has a lifetime greater than the subsequent code frame's lifetime, the intermediate language code frame may be verified as type safe and be loaded into the runtime call stack for execution by the execution engine. In other words, the memory location referenced by the pointer return parameter remains valid during the programmed operation of the method call to MyMethod. In addition, if the memory location referenced by the return parameter had been allocated in a preceding code frame, then the code can still be verified because the lifetime of the preceding code frame would be at least as great as the lifetime of the current and subsequent code frames.

Receiving operation 520 inputs the indicated exemplary source code into a compiler. The source code includes a method on line 4 called CurrentMethod, which is to be executed within the current code frame of FIG. 4. On line 12, the current code frame calls a method MyMethod in the subsequent code frame and passes the address of the object foo, which is allocated on line 7 of the current code frame, as an argument (i.e., passing foo by reference). In operation 522, the source code is compiled into intermediate language (IL) code. Operations 524–528 are substantially equivalent to those described with regard to FIGS. 5A and 5B. In particular, the verification operation 524 verifies the code because the return parameter of the MyMethod call references a memory location having a lifetime that is at least as great as the lifetime of the current code frame. In another embodiment of the present invention, the memory location referenced by the pointer return parameter could have been allocated in a preceding code frame and also been verified.

Figure 5D:
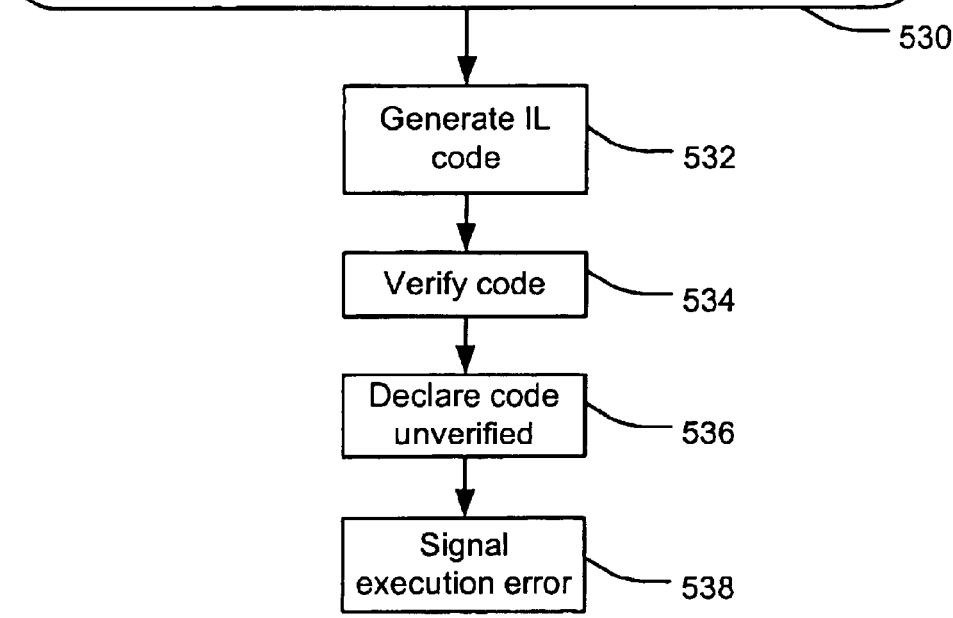
FIG. 5D illustrates operations for declaring a verification error in exemplary source code returning a pointer parameter from a called code frame in an embodiment of the present invention.

FIG. 5D illustrates operations for declaring a verification error in exemplary source code that returns a pointer parameter from a called code frame in an embodiment of the present invention. In the illustrated embodiment, the source code of receiving operation 530 includes a programmed operation (i.e., a method call) that returns a pointer return parameter from method pMethod executed in a subsequent code frame. Because the memory location referenced by the pointer return parameter pReturnfoo is allocated in the subsequent code frame, which does not have a lifetime greater than the current code frame's lifetime, the intermediate language code frame may not be verified as type safe. In other words, the memory location referenced by the pointer return parameter is not valid during the execution of the programmed operation (i.e., the return operation). As a result, an execution error is signaled.

Receiving operation 530 inputs the indicated exemplary source code into a compiler. The source code includes a method on line 4 called CurrentMethod, which is to be executed within the current code frame of FIG. 4. On line 11, the current code frame calls a method MyMethod in the subsequent code frame. On line 18 of MyMethod, an object called fooInternal is allocated within the subsequent code frame. On line 22, the address of fooInternal is returned to the current code frame.

In operation 532, the source code is compiled into intermediate language (IL) code. The verification operation 524 attempts to verify the code. However, the pointer return parameter of the MyMethod call references a memory location having a lifetime that is not at least as great as the lifetime of the current code frame. As such, the code is not verifiable, as declared in operation 526. Operation 528 signals an execution error.

In addition to verifying intermediate language code containing pointer parameters referencing a memory location, a verification module in an embodiment of the present invention verifies pointer parameters that reference value classes. Intermediate language code can generate a pointer parameter that references a value class by taking the address of the value class allocated in a code frame (e.g., "&value_class") or dynamically allocating a value class on the heap and assigning the heap-based address of the value class to a pointer parameter. The verification conditions relating to programmed operations on pointer parameters apply similarly to programmed operations on pointer parameters to a value class (see the description of FIGS. 5A–5D). In addition, the verification conditions relating to programmed operations on a value class also apply similarly to programmed operations on pointer parameters to a value class (see the description of FIG. 6 and the description of programmed operations on "pstructs").

In an alternative embodiment, the return of a pointer parameter is verified in the subsequent code frame (using the perspective of FIGS. 5B–5D). That is, instead of evaluating the method call and its associated return in the current code frame, only the method call (e.g., the calling parameters of the method call) is evaluated in the current code frame. The return instruction (including the return parameter) is evaluated in the subsequent code frame. Accordingly, the type state of the return parameter is maintained between the current code frame and the subsequent code frame. If the pointer return parameter meets the verification conditions for return of referenced-based parameters, then the subsequent code frame can be passed for execution in the execution engine. Otherwise, a type check error is generated prevent execution or cause some other error handling mechanism. It should be understood that an alternative perspective, in which the calling code frame is considered the "preceding" code frame and the returning code frame is considered the "current" code frame can be properly applied to this embodiment as well.

In summary, with regard to FIGS. 5A–5D, a verification module can verify intermediate language code that passes and returns pointer parameters, provided the lifetime of the memory location referenced by the pointer parameter is at least as great as the lifetime of the code frame(s) in which the pointer parameter is used. The verification module tracks the allocation of built-in value types, value classes, and object classes to make relative lifetime determinations.

FIG. 6 depicts operations for verifying intermediate language code passing and returning a user-defined value class by value in an embodiment of the present invention. In the illustrated embodiment, the source code of receiving operation 600 passes a structure MyArgStruct (e.g., an exemplary user-defined value class) by value to a method MyMethod in the subsequent code frame. Because the structure is passed by value, a copy of the structure MyArgStruct is passed into the subsequent code frame. The copy has a lifetime greater than (i.e., in this case, exactly equals) the subsequent code frame's lifetime and does not include any pointers that may have lifetimes shorter than the subsequent code frame. Therefore, the intermediate language code frame may be verified as type safe and be loaded into the runtime call stack for execution by the execution engine.

In addition, the source code returns a structure MyReturnStruct by value from the subsequent code frame. The structure is allocated in the subsequent code frame. However, because the structure is returned by value, a copy of the structure MyReturnStruct is returned to the current code frame as MyReturnStruct. Although the original structure is removed from the stack (i.e., becomes invalid) when the subsequent code frames is removed from the stack, this copy is allocated in the current code stack and has a lifetime greater than (i.e., in this case exactly equals) the current code frame's lifetime. Furthermore, the structure MyReturnStruct1 does not include any pointer parameters that may have lifetimes shorter than the current code frame. Therefore, the intermediate language code frame may be verified as type safe and be loaded into the runtime call stack for execution by the execution engine.

Furthermore, for value classes, the verification module verifies that all fields of the value class are initialized explicitly (e.g., by a write access instruction to each field), because value classes can be stack-allocated, and are therefore not automatically zero-initialized (unlike objects allocated from the garbage collection heap). In one embodiment of the present invention, a bit-pattern is maintained by the verification module to track initialization of fields of each value class.

To support value classes containing child value classes, a hierarchy of bit-patterns may also be maintained. If a value class itself has value class fields, it is more tricky to verify that its fields are initialized down through the hierarchy of value classes, because such fields are initialized by loading the address of the field onto the stack, possibly some parameters, potentially followed by control flow, and eventually calling a constructor on the field. The verification module can track that the address of the field is tied to an instance field, and implicitly consider the instance field to have been initialized by the call to the field's constructor. Having determined that a field has been initialized, the verification module sets a bit in the appropriate bit field. Thereafter, the verification module can verify read accesses to the initialized fields and signal an error for accesses to uninitialized fields.

Receiving operation 600 inputs the indicated exemplary source code into a compiler. The ource code includes a method on line 8 called CurrentMethod, which is to be executed within the current code frame of FIG. 4. On line 3, a type definition defines a value class InternStructType, which does not include any pointer parameters. On line 15, the current code frame calls a method MyMethod in the subsequent code frame. The call to MyMethod passes a user-defined value class instance of type InternStructType by value as an argument and returns a user-defined value class instance of type InternStructType by value as a return parameter.

In operation 602, the source code is compiled into intermediate language (IL) code. In operation 604, the intermediate language code is verified by a verification module. In the illustrated embodiment, the verification module identifies the call to MyMethod in the intermediate language code of the current code frame. The verification module then determines, based on metadata and other typing information, the argument types and return type of the call to MyMethod. To determine whether to declare the intermediate language code verified, the verification module determines, among other conditions, that the arguments are passed by value, the return value is returned by value, and the user-defined value classes argument and return value do not contain pointer parameters. In this case, the verification module determines that the intermediate language code meets the typing rules discussed with regard to FIG. 6, and therefore, operation 606 declares the code verified. Operation 608 passes the code to the runtime call stack for execution.

Figure 7:
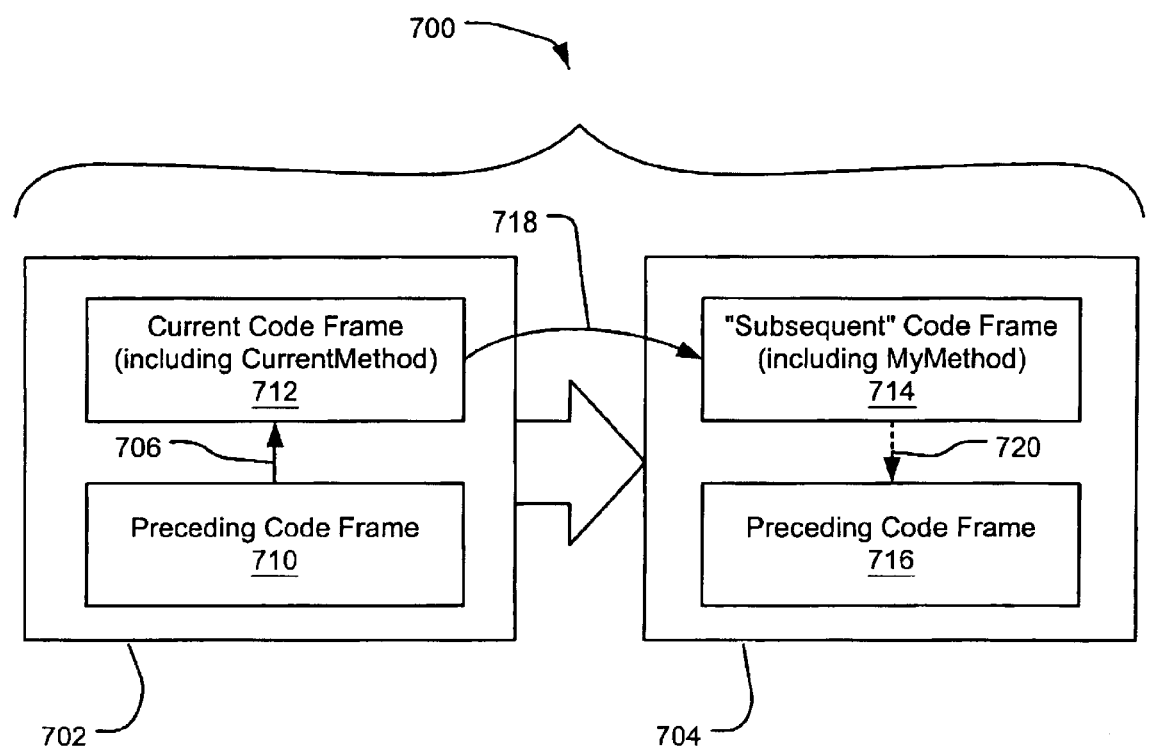
FIG. 7 illustrates changes in a runtime call stack in response to a tail call in an embodiment of the present invention.

FIG. 7 illustrates changes in a runtime call stack in response to a tail call in an embodiment of the present invention. The runtime call stacks (shown generally at 700) represent the same runtime call stacks at different times. A stack 702 represents the runtime call stack prior to a tail call. A preceding code frame 710 makes a call 706 to a current code frame 712. The tail call from the current code frame 712 to a subsequent code frame 714 is represented by the arrow 718. A tail call is a method call that is the last operation to be performed within the current call frame 712. As such, the current code frame 712 may be replaced with the subsequent code frame 714 because no further processing of current code frame 712 is required. Accordingly, the stack 704 represents the runtime call stack after the tail call (i.e., after the current code frame 712 has been removed and the subsequent code frame 714 loaded into the runtime call stack for execution). It is important to note that, in the case of a tail call, the lifetime of the subsequent code frame is at least as great as the lifetime of the current code frame. A dotted line arrow 720 represents the return of execution from the subsequent code frame 714 to the preceding code frame 710.

Figure 8A:
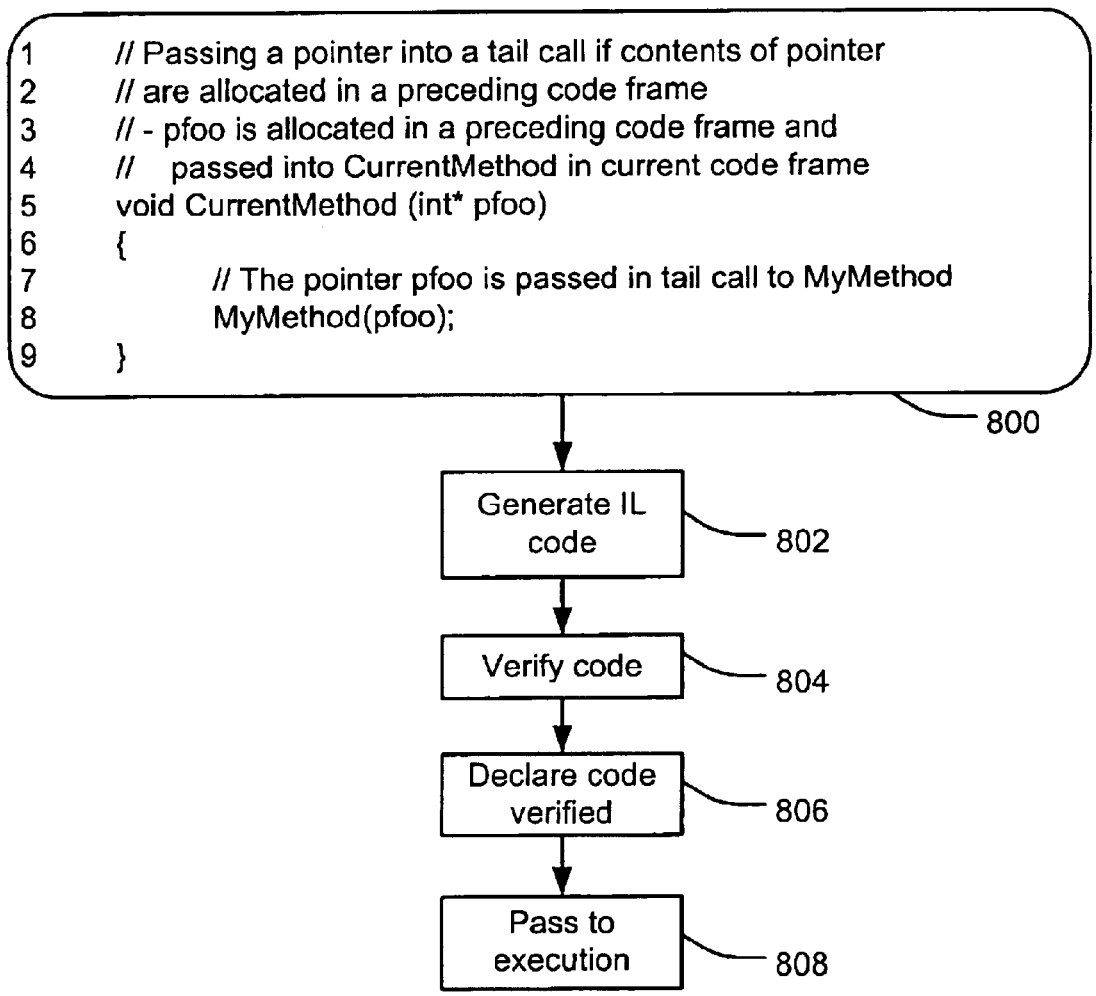
FIG. 8A illustrates operations for verifying intermediate language code that passes a pointer parameter, referencing a memory location allocated in a preceding code frame, in a tail call to a subsequent code frame in an embodiment of the present invention.

FIG. 8A illustrates operations for verifying intermediate language code that passes a pointer parameter, referencing a memory location allocated in a preceding code frame, in a tail call to a subsequent code frame in an embodiment of the present invention. In the illustrated embodiment, the source code of receiving operation 800 passes a pointer parameter pfoo into a method MyMethod in a tail call to a subsequent code frame. Because the memory location referenced by the pointer parameter is allocated in a preceding code frame, the memory location has a lifetime greater than the subsequent code frame's lifetime. Therefore, the intermediate language code frame may be verified as type safe and be loaded for execution by the execution engine.

Receiving operation 800 inputs the indicated exemplary source code into a compiler. The source code includes a method on line 5 called CurrentMethod, which is to be executed within the current code frame of FIG. 7. A preceding code frame has allocated an integer value and passed pointer pfoo to that integer value into the current code frame in call 706 of FIG. 7. On line 15, the current code frame calls a method MyMethod in the subsequent code frame. Because the call to MyMethod is the last operation in the current code frame (e.g., there are no subsequent instructions and MyMethod does not return any value to be assigned within the current code frame), a compiler (in compiling operation 802) optimizes the call as a tail call.

In operation 804, the intermediate language code is verified by a verification module. In the illustrated embodiment, the verification module identifies the call to MyMethod in the intermediate language code of the current code frame and determines that the call is a tail call. The verification module then determines, based on metadata and other typing information, the argument types and return type of the call to MyMethod. To determine whether to declare the intermediate language code verified, the verification module determines, among other conditions, that the arguments includes pointers and the objects referenced by the pointer parameters were allocated in a preceding code frame. In this case, the verification module determines that the intermediate language code meets the verification conditions discussed with regard to FIG. 8A, and therefore operation 806 declares the code verified. Operation 808 passes the code to the runtime call stack for execution.

Figure 8B:
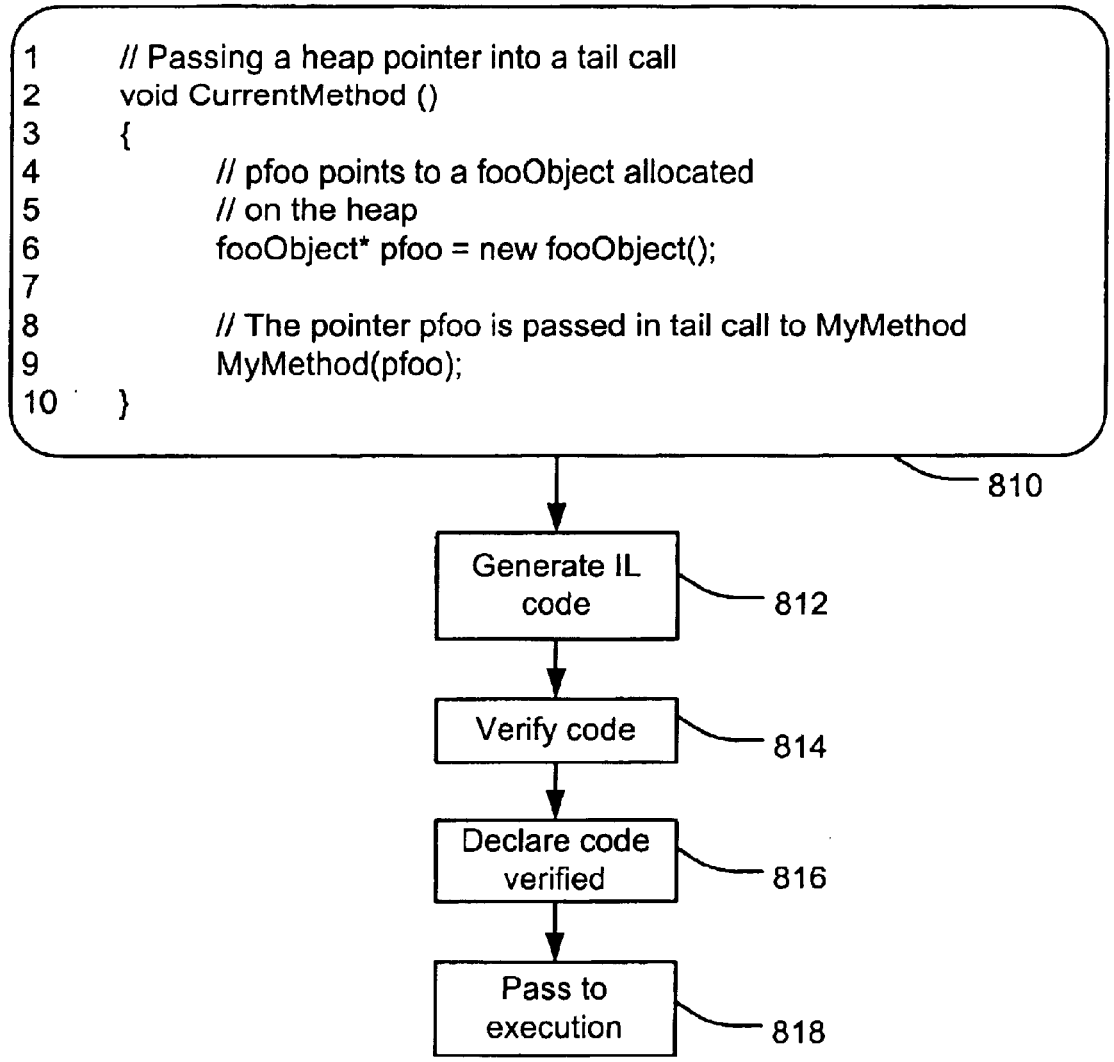
FIG. 8B illustrates operations for verifying intermediate language code that passes a heap pointer parameter in a tail call to a subsequent code frame in an embodiment of the present invention.

FIG. 8B illustrates operations for verifying intermediate language code that passes a heap pointer parameter in a tail call to a subsequent code frame in an embodiment of the present invention. In the illustrated embodiment, the source code of receiving operation 810 passes a heap pointer parameter into a method MyMethod in a tail call to a subsequent code frame. Because the memory location referenced by the pointer parameter is allocated in the heap, the memory location has a lifetime that is at least as great as the execution duration of the MyMethod call (e.g., the memory location's lifetime is greater than the subsequent code frame's lifetime). Therefore, the intermediate language code frame may be verified as type safe and be loaded into the runtime call stack for execution by the execution engine.

Receiving operation 810 inputs the indicated exemplary source code into a compiler. The source code includes a method on line 2 called CurrentMethod, which is to be executed within the current code frame of FIG. 7. On line 6, CurrentMethod allocates a fooObject instance on the heap. On line 9, CurrentMethod calls MyMethod, passing the heap pointer parameter pfoo into the subsequent code frame in a tail call. Because the call to MyMethod is the last operation in the current code frame (e.g., there are no subsequent instructions and MyMethod does not return any value to be assigned within the current code frame), a compiler (in compiling operation 812) optimizes the call as a tail call.

In operation 814, the intermediate language code is verified by a verification module. In the illustrated embodiment, the verification module identifies the call to MyMethod in the intermediate language code of the current code frame and determines that the call is a tail call. The verification module then determines, based on metadata and other typing information, the argument types and return type of the call to MyMethod. To determine whether to declare the intermediate language code verified, the verification module determines, among other conditions, that the arguments to MyMethod include pointer parameters and that the objects referenced by the pointer parameters were allocated in the heap. Therefore, the objects referenced by the pointer parameters have lifetimes that are at least as great as the lifetime of the subsequent code frame and the duration of the tail call operation. In this case, the verification module determines that the intermediate language code meets the typing rules discussed with regard to FIG. 8B, and therefore operation 816 declares the code verified. Operation 818 passes the code to the runtime call stack for execution.

Figure 8C:
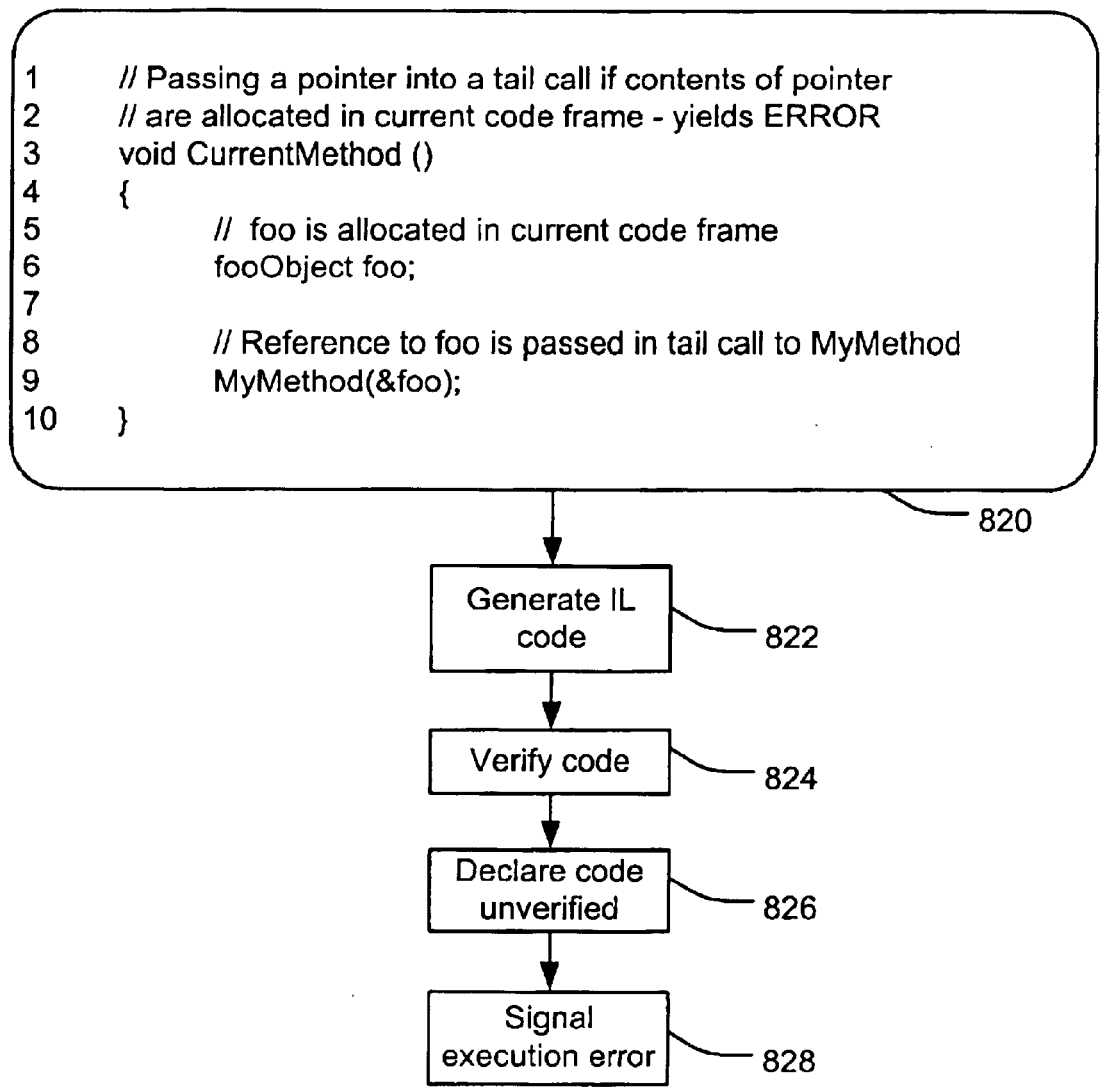
FIG. 8C illustrates operations for signaling an execution error for intermediate language code that passes a pointer parameters, referencing a memory location allocated in the current code frame, in a tail call to a subsequent code frame in an embodiment of the present invention.

FIG. 8C illustrates operations for signaling an execution error for intermediate language code that passes a pointer parameters, referencing a memory location allocated in the current code frame, in a tail call to a subsequent code frame in an embodiment of the present invention. In the illustrated embodiment, the source code of receiving operation 820 passes a pointer parameter into a method MyMethod in a tail call to a subsequent code frame. Because the memory location referenced by the pointer parameter is allocated in the current code frame, which will be removed from the runtime call stack as part of the tail call, the memory location referenced by the pointer parameter does not have a lifetime greater than the subsequent code frame's lifetime (or the duration of the tail call operation). Therefore, the intermediate language code frame is not verified as type safe, resulting in an execution error.

Receiving operation 820 inputs the indicated exemplary source code into a compiler. The source code includes a method on line 3 called CurrentMethod, which is to be executed within the current code frame of FIG. 7. On line 6, the current code frame allocates an object foo. On line 9, the current code frame calls a method MyMethod, in the subsequent code frame. Because the call to MyMethod is the last operation in the current code frame (e.g., there are no subsequent instructions and MyMethod does not return any value to be assigned within the current code frame), a compiler (in compiling operation 822) optimizes the call as a tail call. In operation 824, the intermediate language code is verified by a verification module. In the illustrated embodiment, the verification module identifies the call to MyMethod in the intermediate language code of the current code frame and determines that the call is a tail call. The verification module then determines, based on metadata and other typing information, the argument types of the call to MyMethod. To determine whether to declare the intermediate language code verified, the verification module determines, among other conditions, that the argument(s) to MyMethod includes one or more pointer parameters and that the objects referenced by the pointers were not allocated so as to have a lifetime greater than that of the subsequent code frame. In this case, the verification module determines that the intermediate language code does not meet the verification conditions discussed with regard to FIG. 8C, because the object referenced by the pointer parameters was allocated in the current code frame, which, in the tail call operation, does not have a lifetime greater than the subsequent code frame. Therefore operation 826 declares the code unverified and operation 818 signals an execution error.

Figure 9:
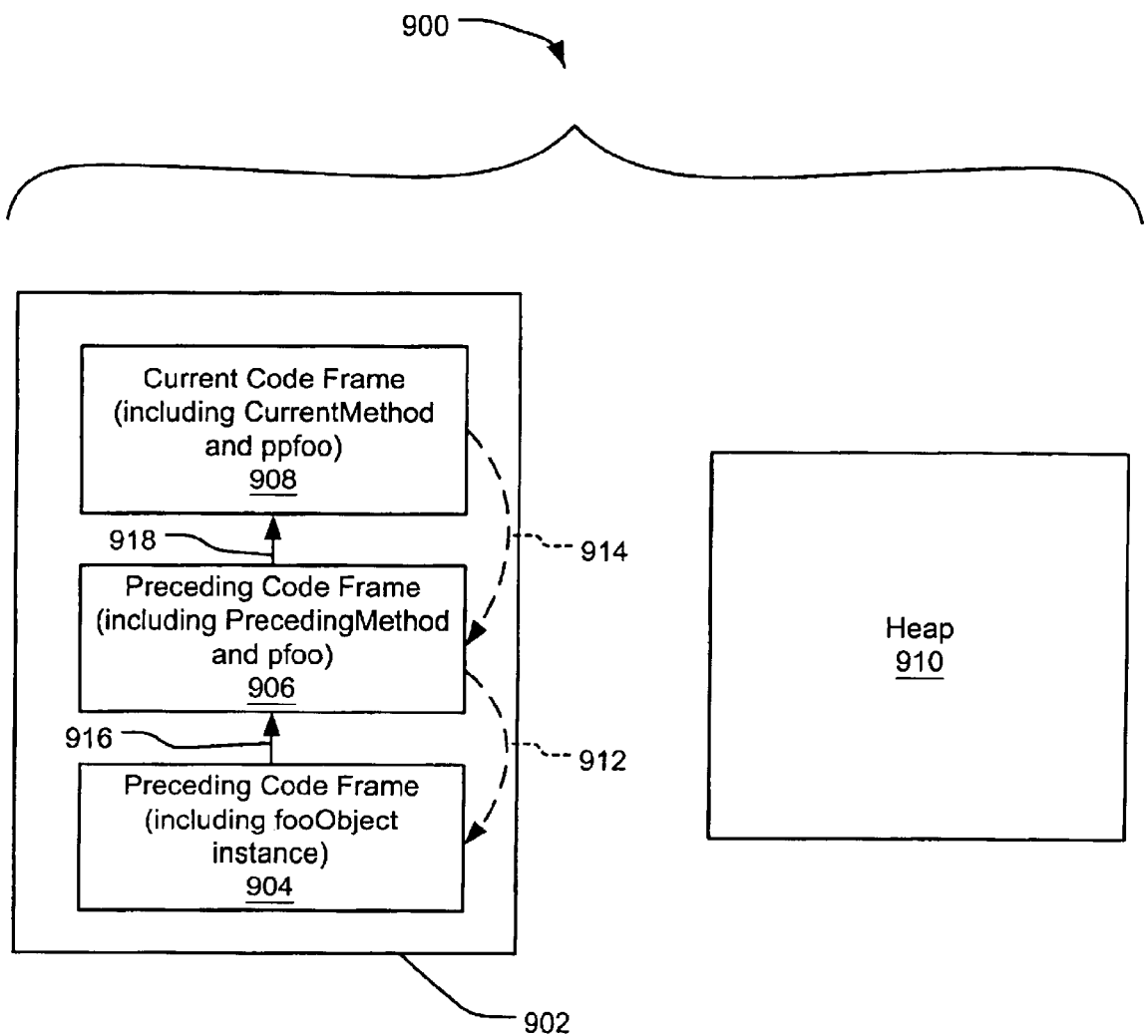
FIG. 9 illustrates a runtime call stack including exemplary access to contents of an exemplary nested pointer in an embodiment of the present invention.

FIG. 9 illustrates a runtime call stack including exemplary access to contents of an exemplary nested pointer in an embodiment of the present invention. The elements 900 represent memory regions within a runtime environment on a computer system, similar to those of FIG. 4. Runtime call stack 902 includes a preceding code frame 904, a second preceding current code frame 906, and a current code frame 908. Calls between the code frames are designated by arrows 916 and 918. The heap 910 represents an area of memory reserved for dynamic allocation of data by the code frames of the runtime call stack 902. It should be understood that the runtime call stack 902 merely represents an exemplary call stack and that embodiments of the present invention may have more code frames or fewer code frames, in accordance with a program's runtime characteristics.

It should also be understood that nested pointers may also be embodied by pointers to value classes that contain pointer parameters. In this embodiment, a first memory location contains a pointer (e.g., "pStruct") to a value class (e.g., "struct") that includes a field (i.e., a second memory location) that stores a pointer parameter. Nested pointers in this embodiment are subject to substantially the same verification conditions as nested pointers that do not include value classes.

Although the code frames of FIG. 9 are illustrated as being located in the runtime call stack, it should be understood that the verification process occurs before each code frame is actually loaded into the runtime call stack. During the verification process, execution of each code frame is merely simulated, not actually performed. As such, the code frames of FIG. 9 are illustrated within the runtime call stack merely to provide a reference to their relative execution dependencies.

In the exemplary embodiment of FIG. 9, the preceding code frame 904 allocates an instance of fooObject at a target memory location in a target code frame. The address of the target memory location is passed to the preceding code frame 906 in a method call to PrecedingMethod (see arrow 916). The address of the fooObject instance is received by PrecedingMethod as the pointer pfoo, which directly references the fooObject instance. The address of pfoo is passed to the method CurrentMethod (see arrow 918) in the current code frame. The address of the memory location containing pfoo is received by CurrentMethod as the nested pointer ppfoo in the current code frame, which indirectly references the fooObject instance through the pointer pfoo. As represented by the dashed line arrows 912 and 914, the nested pointer ppfoo points through the preceding code frame 906 to the fooObject instance allocated in the preceding code frame 904. Although the nested pointer ppfoo includes only two component pointer levels, nested pointers having more than two component pointer levels are also contemplated within the scope of the present invention.

Using a C Language-like syntax, the fooObject instance (i.e., the contents of the nested pointer) can be accessed through the nested pointer using the expression "**ppfoo". Likewise, the memory location storing the pointer pfoo in the preceding code frame 906 can be accessed through the nested pointer using the expression "*ppfoo". Using the latter expression, "*ppfoo", a program instruction can access the memory location storing the address of the fooObject instance. As such, a program instruction can read the address stored by pfoo or write a new address to pfoo (e.g., causing the nested pointer ppfoo to point to another memory location). In one embodiment of the present invention, the instruction causing the write access may be verified if the memory location of the component pointer parameter (e.g., the memory location storing pfoo) resides in the current code frame. In an alternative embodiment, the instruction causing the write access may be verified if the new target memory location resides in a code frame that equals or precedes the code frame storing the component pointer parameter.

FIG. 10 illustrates operations for verifying intermediate language code that accesses contents of an exemplary nested pointer in an embodiment of the present invention. In the illustrated embodiment, the source code of receiving operation 1000 includes read and write access operations to contents (i.e., a target memory location storing a non-pointer value) of a nested pointer ppfoo. Because each component of the nested pointer (i.e., ppfoo, pfoo, and foo) all have lifetimes that are at least as great as the lifetime of the current code frame, read and write access to foo through the nested pointer is type safe. Therefore, the intermediate language code frame may be verified and loaded into the runtime call stack for execution by the execution engine.

Receiving operation 1000 inputs the indicated exemplary source code into a compiler. The source code includes a method on line 5 called PrecedingMethod, which is to be executed within the preceding code frame 906 of FIG. 9. A pointer parameter pfoo to a fooObject allocated in the preceding code frame 904 of FIG. 9 is passed as an argument to PrecedingMethod on line 5. The memory location for storing the pointer pfoo is allocated in the preceding code frame 906 of FIG. 9. On line 10, the address of the memory location storing the pointer parameter pfoo is passed to a method called CurrentMethod in the current code frame 908 of FIG. 9. A nested pointer ppfoo to a fooObject allocated in the preceding code frame 904 of FIG. 9 is passed as an argument to CurrentMethod on line 13. On line 17, the contents of the nested pointer (i.e., the fooObject instance in the preceding code frame 904 of FIG. 9) are read in an assignment operation. On line 20, the contents of the nested pointer are written to (e.g., modified) in an operation.

In operation 1002, the source code is compiled into intermediate language (IL) code. In operation 1004, the intermediate language code is verified by a verification module. In the illustrated embodiment, the verification module identifies the nested pointer ppfoo in the intermediate language code of the current code frame. The verification module then determines, based on metadata and other typing information, the kinds of operations performed on ppfoo in CurrentMethod. To determine whether to declare the intermediate language code verified, the verification module determines, among other conditions, whether the contents of the nested pointer are being accessed (read or write) or whether one of the component pointers in the nested pointer is being accessed (e.g., pfoo). If the contents of the nested pointer are being modified, the current code frame can be deemed type safe. However, if one of the component pointers in the nested pointer is accessed, additional testing is required. In this case, the verification module determines that the intermediate language code meets the verification conditions discussed with regard to FIG. 10 (i.e., access to contents only), and therefore operation 1006 declares the code verified. Operation 1008 passes the code to the runtime call stack for execution.

Figure 11:
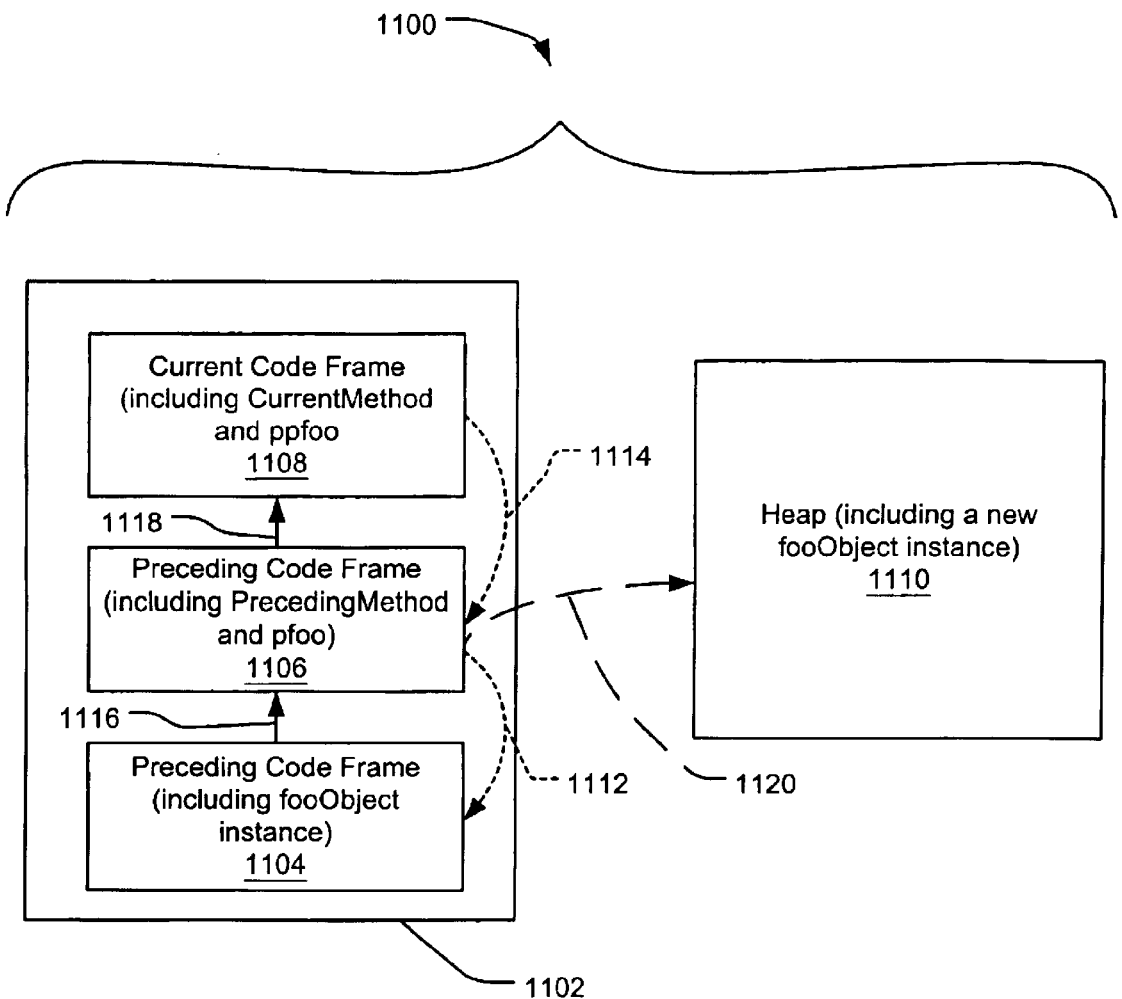
FIG. 11 illustrates a runtime call stack including exemplary access to a component pointer of a nested pointer in an embodiment of the present invention.

FIG. 11 illustrates a runtime call stack including exemplary access to a component pointer of a nested pointer in an embodiment of the present invention. The elements 1100 represent memory regions within a runtime environment on a computer system, similar to those of FIGS. 4 and 9. Runtime call stack 1102 includes a preceding code frame 1104, a second preceding current code frame 1106, and a current code frame 1108. Calls between the code frames are designated by arrows 116 and 1118. The heap 1110 represents an area of memory reserved for dynamic allocation of data by the code frames of the runtime call stack 1102. It should be understood that the runtime call stack 1102 merely represents an exemplary call stack and that embodiments of the present invention may have more code frames or fewer code frames, in accordance with a program's runtime characteristics.

Although the code frames of FIG. 11 are illustrated as being located in the runtime call stack, it should be understood that the verification process occurs before each code frame is actually loaded into the runtime call stack. During the verification process, execution of each code frame is merely simulated, not actually performed. As such, the code frames of FIG. 11 are illustrated within the runtime call stack merely to provide a reference to their relative execution dependencies.

In the exemplary embodiment of FIG. 11, the preceding code frame 1104 allocates an instance of fooObject, the address of which is passed to the preceding code frame 1106 in a method call to PrecedingMethod (see arrow 1116). The address to the fooObject instance is received by Preceding-Method as the pointer pfoo, the address of which is passed to the method CurrentMethod (see arrow 1118) in the current code frame. The address of pfoo is received by Current-Method as the nested pointer ppfoo in the current code frame. The nested pointer ppfoo is an example of a reference-based parameter. As represented by the dotted line arrows 1112 and 1114, the nested pointer ppfoo initially points through the preceding code frame 1106 to the fooObject instance allocated in the preceding code frame 1104.

The address pfoo stored in a memory location in the preceding code frame 1106 can be read by operations in the current code frame 1108. However, certain limitations are imposed on instructions for modifying the address pfoo. In order to guarantee type safety, a pointer that initially created to point to an original memory location (which has an associated lifetime) may be changed to point to a memory location only if the lifetime of the new memory location is at least as great as the lifetime of the original memory location.

In FIG. 1, dashed line arrow 1120 indicates that the pointer pfoo has been modified to point to an new fooObject instance allocated in the heap, which has a lifetime that is at least as great as the lifetime of the original fooObject instance in the preceding code frame 1104. As such, the nested pointer has also been modified to point to the new fooObject instance in the heap.

FIG. 12 illustrates operations for verifying intermediate language code that write accesses a component pointer of a nested pointer using a heap pointer in an embodiment of the present invention. In the illustrated embodiment, the source code of receiving operation 1200 writes a heap pointer to a component pointer of a nested pointer ppfoo. The heap pointer has a lifetime greater than the code frames associated with the original memory locations of the nested pointer components (i.e., ppfoo, pfoo, and foo). Therefore, the intermediate language code frame may be verified and loaded into the runtime call stack for execution by the execution engine.

The source code of receiving operation 1200 is consistent with the source code of FIG. 10 up to line 16, in which a new fooObject is allocated at pMyfoo in the heap. In line 20, the address of the new pointer is loaded into *ppfoo, which is equivalent to pfoo. After execution of the intermediate language code generated from line 20, the nested pointer ppfoo will point to the new fooObject in the heap.

In operation 1202, the source code is compiled into intermediate language (IL) code. In operation 1204, the intermediate language code is verified by a verification module. In the illustrated embodiment, the verification module identifies the nested pointer ppfoo in the intermediate language code of the current code frame. The verification module then determines, based on metadata and other typing information (e.g., the tracking of type states), the kinds of operations performed on ppfoo in CurrentMethod. To determine whether to declare the intermediate language code verified, the verification module determines, among other conditions, whether one of the component pointers in the nested pointer is being accessed (e.g., pfoo). If the access to the component pointer is read only, the programmed operation (e.g., the read access or the write access) is type safe. If, however, one of the component pointers in the nested pointer is modified, the verification module determines whether the lifetime of the new memory location is at least as great as the lifetime of the previous components (i.e., ppfoo, pfoo, and foo). In this case, the verification module determines that the intermediate language code meets the verification conditions discussed with regard to FIG. 12 (i.e., because the memory location in the heap has a lifetime that is at least as great the lifetime of the code frames associated with the nested pointer), and therefore operation 1206 declares the code verified. Operation 1208 passes the code to the runtime call stack for execution.

Figure 13:
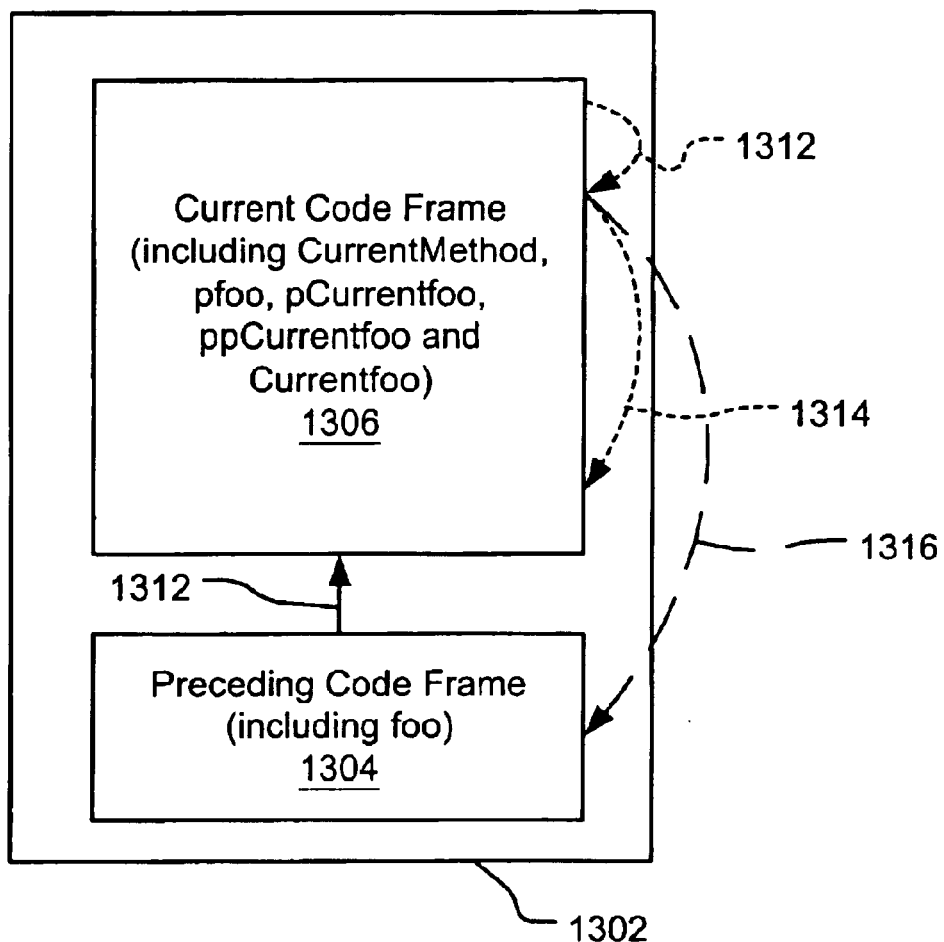
FIG. 13 illustrates a runtime call stack including exemplary access to a component pointer of a nested pointer in an embodiment of the present invention.

FIG. 13 illustrates a runtime call stack including exemplary access to a component pointer of a nested pointer in an embodiment of the present invention. Runtime call stack 1302 is similar to the runtime calls stacks shown in FIG. 4, 9, and 11 and includes a preceding code frame 1304 and a current code frame 1306. A call between the code frames is designated by arrows 1312. It should be understood that the runtime call stack 1102 merely represents an exemplary call stack and that embodiments of the present invention may have more code frames or fewer code frames, in accordance with a program's runtime characteristics.

Although the code frames of FIG. 13 are illustrated as being located in the runtime call stack, it should be understood that the verification process occurs before each code frame is actually loaded into the runtime call stack. During the verification process, execution of each code frame is merely simulated, not actually performed. As such, the code frames of FIG. 13 are illustrated within the runtime call stack merely to provide a reference to their relative execution dependencies.

In the exemplary embodiment of FIG. 13, the preceding code frame 1304 allocates an instance of fooObject, the address of which is passed to the current code frame 1306 in a method call to PrecedingMethod (see arrow 1312). The address to the fooObject instance is received in Current-Method as the pointer pfoo. Another fooObject instance Current foo is allocated within CurrentMethod. The address of Current foo is assigned to a pointer pCurrentfoo, the address of which is then assigned to a nested pointer ppfoo, which is an example of a reference-based parameter. To summarize, the nested pointer ppfoo initially is created to point to a fooObject called Currentfoo in the current stack frame, as represented by the dotted line arrows 1314 and 1316. After the nested pointer ppfoo has been created, programmed operations in CurrentMethod assign the pointer pfoo to the pointer pCurrentfoo, causing the nested pointer to point into the preceding code frame 1304, as indicated by dashed line arrow 1316.

FIG. 14 illustrates operations for verifying intermediate language code that write accesses a component pointer of a nested pointer using an address of a memory location allocated in a preceding code frame in an embodiment of the present invention. In the illustrated embodiment, the source code of receiving operation 1400 writes a new address to a component pointer pCurrentfoo of a nested pointer ppCurrentfoo, thereby modifying the memory location referenced by the nested pointer. The new memory location foo is allocated in the preceding code frame and has a lifetime greater than the originally referenced memory locations of the component pointers of the nested pointer (i.e., ppCurrentfoo and pCurrentfoo). Therefore, the intermediate language code frame may be verified and loaded into the runtime call stack for execution by the execution engine. Note, however, that to have modified pCurrentfoo with an address of a memory location having a lifetime that is not at least as long as the lifetime of the memory location pCurrentfoo would not have been deemed type safe and would have resulted in an execution error.

The source code of receiving operation 1400 allocated a fooObject instance foo in the preceding code frame on line 8. The address of foo is passed to the current code frame on line 11. In CurrentMethod, at line 18, another fooObject instance, Currentfoo, is allocated within the current code frame. On line 19, the address of Currentfoo is stored in a pointer pCurrentfoo. On line 22, the address of pCurrentfoo is stored in the nested pointer ppCurrentfoo. On line 27, the component pointer pCurrentfoo of the nested pointer ppCurrentfoo is modified to point at the memory location storing foo in the preceding code frame.

In operation 1402, the source code is compiled into intermediate language (IL) code. In operation 1404, the intermediate language code is verified by a verification module. In the illustrated embodiment, the verification module identifies the nested pointer ppCurrentfoo in the intermediate language code of the current code frame. The verification module then determines, based on metadata and other typing information, the kinds of operations performed on ppCurrentfoo in CurrentMethod. To determine whether to declare the intermediate language code verified, the verification module determines, among other conditions, whether the whether one of the component pointers in the nested pointer is being accessed (e.g., pCurrentfoo). If the access to the component pointer is read only, the operation is type safe. If, however, one of the component pointers in the nested pointer is modified, the verification module determines whether the lifetime of the new memory location (i.e., foo in the preceding code frame) is at least as great as the lifetime of the modified component pointers (i.e., ppfoo and pfoo). In this case, the verification module determines that the intermediate language code meets the typing rules discussed with regard to FIG. 14 (i.e., because the memory location in the preceding code frame has a lifetime that is at least as great as the lifetime of component pointers of the nested pointer), and therefore operation 1406 declares the code verified and operation 1408 passes the code to the runtime call stack for execution.

In an alternative embodiment of the process illustrated in FIG. 14, write accessing pfoo through ppfoo (i.e., writing to *ppfoo) is type safe because the memory location pfoo resides in the current code frame. Accordingly, pfoo is guaranteed to have a lifetime that is at least as long any existing memory location in the heap or any preceding code frame. As such, any access to pfoo and its target location will occur within the current code frame, and no access to pfoo will occur outside the lifetime of the current code frame. Therefore, when verifying accesses to nested pointers, write access in the current code frame to a component pointer that resides in the current code frame is type safe. If the component pointer resides in a preceding code frame, other verification conditions must be considered, as discussed in the previous embodiment.

While nested pointer involve a string of component pointers referencing a target memory location, value classes that contain pointers present similar typing concerns. For example, if a current code frame passes a value class containing a pointer in a method call to a subsequent code frame, the signature of the method call allows the type of the value class argument to be tracked on both sides of the method call (i.e., the declaration of the value class statically defines the type of the argument in the current code frame; the argument declaration statically defines the type of the argument in the subsequent code frame). In an embodiment of the present invention, discussed with regard to FIG. 6, allows value classes to be passed by value as arguments from methods and to be returned by value from methods, with the condition that the value class does not contain pointer values.

In an alternative embodiment of the present invention, intermediate language code containing value classes that contain pointers (referred to as a "pstruct") passed by value as arguments into a method call may be verified as type safe, provided the following verification conditions are satisfied:

1) the address of the pstruct is not passed as an argument; and 2) the method call does not constitute a tail call.

By enforcing these verification conditions on a programmed operation that passes a pstruct as an argument to a method call, the memory location referenced by the pointer contained within the pstruct is guaranteed to remain valid during the execution of the programmed operation (i.e., the method call, which is executed in the subsequent code frame). As such, type safety is ensured and the intermediate language code may be verified as type safe and passed on for execution within the runtime environment.

In another alternative embodiment of the present invention, intermediate language code containing a pstruct that is read in a programmed operation may be verified as type safe. A programmed operation that reads a pointer of a pstruct, the memory location referenced by the pointer contained within the pstruct is guaranteed to remain valid during the execution of the programmed operation (i.e., the read operation). As such, type safety is ensured and the intermediate language code may be verified as type safe and passed on for execution within the runtime environment.

In yet another alternative embodiment of the present invention, intermediate language code containing a programmed operation in which a pointer is written into one of the fields of the pstruct may be verified as type safe, provided the memory location referenced by the new pointer is in the heap.

By enforcing these verification conditions on a programmed operation that writes a pointer in a pstruct, the memory location referenced by the pointer contained within the pstruct is guaranteed to remain valid during the execution of the programmed operation (i.e., the write operation). As such, type safety is ensured and the intermediate language code may be verified as type safe and passed on for execution within the runtime environment.

Passing an argument by RefAny is similar to passing a value by reference, except that the address of the memory location is associated with static type information (e.g., a 2-field data structure is passed, wherein one field contains the address of the memory location and the other field contains a type code). In an embodiment of the present invention, a verification module may apply verification conditions to ensure the type safety of programmed operations relating to RefAny parameters.

Intermediate language code containing a programmed operation that accesses a RefAny parameter may be verified as type safe. For example, the RefAny parameter may be passed to a subsequent code frame, although the RefAny parameter may not be returned from a subsequent code frame. By enforcing these verification conditions on a programmed operation that passes a RefAny parameter, the memory location referenced by the pointer contained within the RefAny parameter is guaranteed to remain valid during the execution of the programmed operation (i.e., the method call operation). As such, type safety is ensured and the intermediate language code may be verified as type safe and passed on for execution within the runtime environment. Programmed operations may also read access either the address contained in the RefAny parameter or the type information in the RefAny parameter.

In another embodiment of the present invention, natural size types are a mechanism in the execution engine for deferring the choice of a value's size. These data types have a fixed but unknown size when the intermediate language code is generated at source code compile time. Instead, the choice of the data type size is deferred until just-in-time compilation, when the execution engine has been initialized and the execution platform architecture is known. The deferred selection of type sizes implies that field and stack frame offsets are also not known at source code compile time. For languages like Java and Visual Basic, where field offsets are not computed at source code compile time, deferred size selection allows a JIT compiler to optimize compiled code for a given architecture's native register sizes, for example. In languages like C, a conservative assumption that types occupy 8 bytes can be initially accepted during compile time (into the intermediate language code) to allow such optimization to be accomplished during JIT compilation.

For example, in a given execution platform architecture, 32-bit integer operation are faster (i.e., require fewer machine code instruction cycles) than 64-bit integer operations. As such, if given to indication that the size of a given value is subject to deferred size selection, the JIT compiler can select a 32-bit size for the value, thereby optimizing performance of the executable code.

In an embodiment of the present invention, metadata is used to communicate typing information between the source code compiler and the execution engine. Metadata can also define the type of a value in intermediate language code to have a "natural type" size. Such a natural type size value can be initially specified in the source code (e.g., using notation such as "(native int iValue)") or optimized by the compiler. Based on the metadata designation, the JIT compiler can determine that the value is to be allocated in accordance with the native register size of the platform during JIT compilation.

Figure 15:
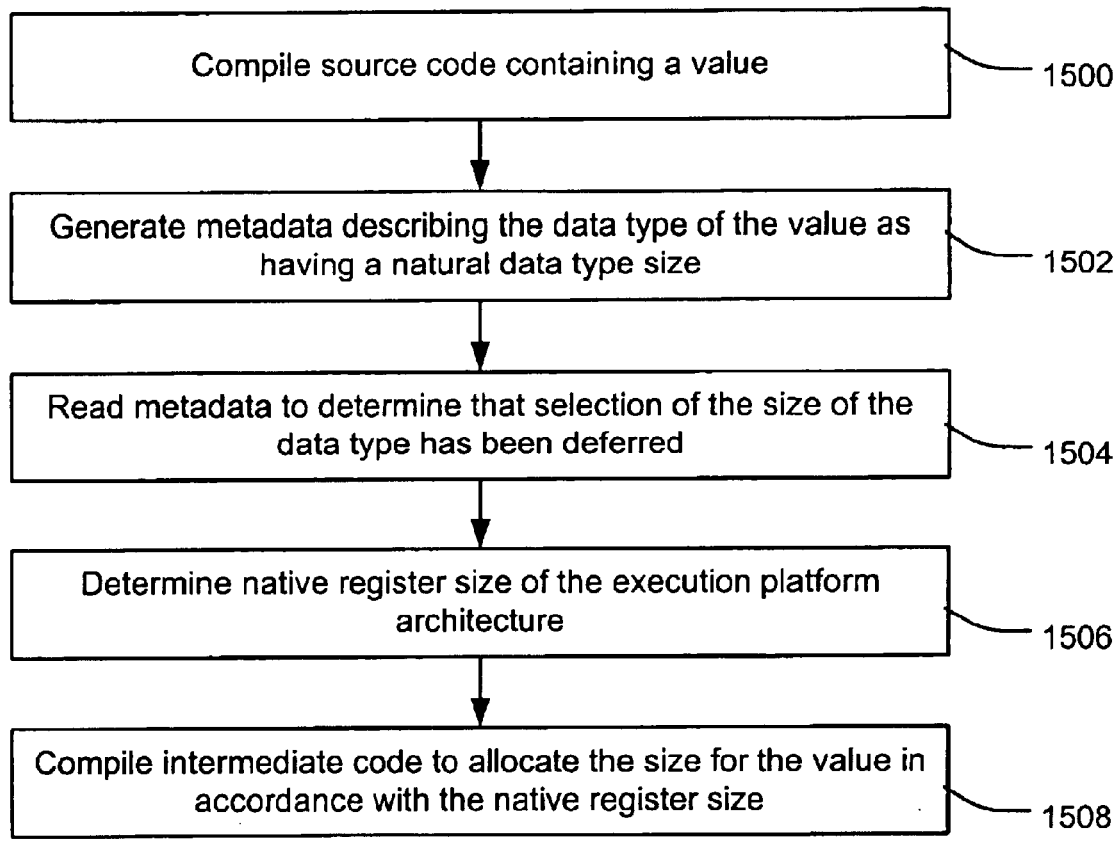
FIG. 15 depicts operations for deferring selection of a size of a data type in intermediate language code in an embodiment of the present invention.

FIG. 15 depicts operations for deferring selection of a size of a data type in intermediate language code in an embodiment of the present invention. A compilation operation 1500 compiles source code containing a value of a given data type and generates intermediate language code. A generation operation 1502 generates metadata in association with the intermediate language code. The metadata describes the data type as having a natural data type size. A reading operation 1504 reads the metadata that is associated with the intermediate language code. The metadata indicates that the selection of the size of the data type has been deferred. The determining operation 1506 determines the native register size of the execution platform architecture. In one embodiment, the native register size is hard-coded into the JIT compiler or included in an associated configuration file. Alternatively, a JIT compiler can determine the native register size by querying the operating system or the computer platform itself. Another compilation operation 1508 allocates the size for the value in accordance with the native register size. For example, if the value is declared as a natural size integer data type, a JIT nay determine that the native register size is 16-bits and therefore allocate the value to occupy 16-bits of memory. In addition, machine code may be generated by the JIT compiler to include instructions for operating the newly allocated 16-bit integer value (i.e., a 16-bit operand).

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

We claim:

1. A computer program product encoding a computer program for executing on a computer system a computer process for verifying a current code frame of intermediate language code for execution within a runtime call stack of a runtime environment, the intermediate language code being compiled from source code in one or more high level languages, the computer process comprising:

receiving the current code frame of intermediate language code;

identifying a reference-based parameter in the current code frame, the reference-based parameter referencing a memory location within the runtime environment;

identifying a programmed operation operating on the reference-based parameter within the current code frame; and evaluating the current code frame to determine whether the programmed operation on the reference-based parameter satisfies one or more verification conditions that ensure that the memory location referenced by the reference-based parameter will be valid when accessed during execution within the runtime call stack.

2. The computer program product of claim 1 wherein the computer process further comprises:

determining a type state associated with the reference based parameter before the programmed operation; and tracking a change in the type state associated with the referenced based parameter based on an effect of the programmed operation on the type state.

3. The computer program product of claim 1 wherein the computer process further comprises:

determining a first type state associated with the reference-based parameter before the programmed operation; and determining a second type state associated with the referenced based parameter after the programmed operation.

4. The computer program product of claim 3 wherein the computer process further comprises:

determining an effect of the programmed operation on the first type state to determine the second type state.

5. The computer program product of claim 1 wherein the computer process further comprises:

passing the current code frame into the runtime call stack for execution, if the evaluating operation determines that the memory location referenced by the reference-based parameter will remain valid when accessed during execution within the runtime call stack.

6. The computer program product of claim 1 wherein the computer process further comprises:

signaling a type check error, if the memory location referenced by the reference-based parameter will not be valid when accessed during execution within the runtime call stack.

7. The computer program product of claim 1 wherein the operation of identifying the referenced-based parameter comprises:

identifying within the current code frame a pointer parameter as the reference-based parameter.

8. The computer program product of claim 7 wherein the operation of identifying the programmed operation comprises:

identifying an instruction within the current code frame that is programmed to pass the pointer parameter in a call to a subsequent code frame on the runtime call stack.

9. The computer program product of claim 8 wherein the evaluating operation comprises:

determining that the memory location referenced by the pointer parameter has a lifetime that is at least as great as a lifetime of the subsequent code frame in the runtime call stack.

10. The computer program product of claim 8 wherein the computer process further comprises:

passing the current code frame into the runtime call stack for execution, if the instruction is programmed to pass the pointer parameter in the call to the subsequent code frame on the runtime call stack.

11. The computer program product of claim 7 wherein the operation of identifying a programmed operation comprises:

identifying an instruction in the current code frame that is programmed as a tail call to pass the pointer parameter into a subsequent code frame on the runtime call stack.

12. The computer program product of claim 11 wherein the evaluating operation comprises:

determining that the memory location referenced by the pointer parameter will be valid during execution of the subsequent code frame after the current code frame is removed from the runtime call stack.

13. The computer program product of claim 12 wherein the memory location referenced by the pointer parameter is allocated in a preceding code frame.

14. The computer program product of claim 12 wherein the memory location referenced by the pointer parameter is allocated in a heap.

15. The computer program product of claim 11 wherein the evaluating operation comprises:

determining that the memory location referenced by the pointer parameter has a lifetime that is at least as great as a lifetime of the subsequent code frame within the runtime call stack.

16. The computer program product of claim 11 wherein the computer process further comprises:

signaling a type check error, if the memory location referenced by pointer parameter is allocated within the current code frame.

17. The computer program product of claim 1 wherein the operation of identifying the referenced-based parameter comprises:

identifying within the current code frame a pointer return parameter as the reference-based parameter.

18. The computer program product of claim 17 wherein the operation of identifying the programmed operation comprises:

identifying an instruction within the current code frame that is programmed to call into a subsequent code frame on the runtime call stack and to return the pointer return parameter from the subsequent code frame.

19. The computer program product of claim 18 wherein the evaluating operation comprises determining that the memory location referenced by the pointer return parameter has a lifetime that is at least as great as a lifetime of the current code frame in the runtime call stack.

20. The computer program product of claim 18 wherein the computer process further comprises:

passing the current code frame into the runtime call stack for execution, if the evaluating operation determines that the memory location referenced by the pointer return parameter has a lifetime that is at least as great as a lifetime of the current code frame in the runtime call stack.

21. The computer program product of claim 20 wherein the pointer return parameter directly references a memory location allocated in a heap.

22. The computer program product of claim 20 wherein the pointer return parameter directly references a memory location statically allocated in a global memory pool.

23. The computer program product of claim 20 wherein the pointer return parameter directly references a memory location allocated in the current code frame.

24. The computer program product of claim 20 wherein the pointer return parameter directly references a memory location allocated in a preceding code frame.

25. The computer program product of claim 20 wherein the memory location referenced by the pointer parameter is statically allocated in a global memory pool.

26. The computer program product of claim 18 wherein the evaluating operation comprises:

determining that the memory location referenced by the pointer return parameter will be valid during execution after the subsequent code frame is removed from the runtime call stack.

27. The computer program product of claim 18 wherein the computer process further comprises:

signaling a type check error, if the memory location referenced by the pointer return parameter is allocated within the subsequent code frame within the runtime call stack.

28. The computer program product of claim 18 wherein the computer process further comprises:

signaling a type check error, if the memory location by the pointer return parameter is allocated within the current code frame within the runtime call stack and the programmed operation constitutes a tail call.

29. The computer program of claim 1 wherein the operation of identifying a programmed operation comprises:

identifying an instruction within the current code frame that is programmed to return the pointer return parameter to a preceding code frame.

30. The computer program of claim 29 wherein the evaluating operation comprises:

determining that the memory location referenced by the pointer parameter will be valid during execution of the preceding code frame after the current code frame is removed from the runtime call stack.

31. The computer program product of claim 29 wherein the computer process further comprises:

passing the current code frame into the runtime call stack for execution, if the instruction is programmed to return the pointer parameter to the preceding code frame on the runtime call stack and the pointer parameter references a memory location having a lifetime that is at least as great as a lifetime of the preceding code frame.

32. The computer program product of claim 1 wherein the operation of identifying a reference-based parameter comprises:

identifying within the current code frame a nested pointer parameter as the reference-based parameter, the nested pointer parameter being stored in a first memory location and referencing a second memory location that stores a component pointer parameter that references a target memory location within the runtime environment.

33. The computer program product of claim 32 wherein the target memory location stores a non-pointer value.

34. The computer program product of claim 32 wherein the operation of identifying a programmed operation comprises:

identifying an instruction within the current code frame that is programmed to access at least one of the first memory location and the second memory location.

35. The computer program product of claim 34 wherein the instruction is programmed to read access the second memory location through the first memory location.

36. The computer program product of claim 35 wherein the computer process further comprises:

passing the current code frame into the runtime call stack for execution, if the second memory location resides in the current code frame.

37. The computer program product of claim 34 wherein the computer process further comprises:

passing the current code frame into the runtime call stack for execution, if the instruction write accesses the second memory location to reference a new target memory location in a heap.

38. The computer program product of claim 34 wherein the evaluating operation comprises:

determining that the instruction is programmed to write to the second memory location and the second memory location resides in the current code frame.

39. The computer program product of claim 32 wherein the computer process further comprises:

passing the current code frame into the runtime call stack for execution, if no instruction in the current code frame write accesses either of the first memory location and the second memory location.

40. The computer program product of claim 32 wherein the operation of identifying an instruction comprises identifying an instruction in the current code frame that is programmed to write an address of a new target memory location to the component pointer parameter, and the computer process further comprises:

passing the current code frame into the runtime call stack for execution, if a lifetime of the new target memory location is at least as great as a lifetime of the second memory location.

41. The computer program product of claim 1 wherein the operation of identifying the reference-based parameter comprises:

identifying within the current code frame a value class parameter containing a pointer parameter as the reference-based parameter.

42. The computer program product of claim 41 wherein the operation of identifying the programmed operation comprises:

identifying an instruction within the current code frame that is programmed to pass the value class parameter by value in a call to a subsequent code frame on the runtime call stack.

43. The computer program product of claim 42 wherein the evaluating operation comprises:

determining that the pointer parameter within the value class parameter has a lifetime that is at least as great as a lifetime of the subsequent code frame in the runtime call stack.

44. The computer program product of claim 42 wherein the computer process further comprises:

passing the current code frame into the runtime call stack for execution, if the instruction is programmed to pass the value class by value in the call to the subsequent code frame on the runtime call stack.

45. The computer program product of claim 41 wherein the pointer parameter references a memory location and the operation of identifying the programmed operation comprises:

identifying an instruction within the current code frame that is programmed to perform a read access to the memory location.

46. The computer program product of claim 45 wherein the evaluating operation comprises:

determining that no other instruction within the current code frame is programmed to write to the memory location.

47. The computer program product of claim 41 wherein the pointer parameter references a memory location and the operation of identifying the programmed operation comprises:

identifying an instruction within the current code frame that is programmed to perform a write access to the memory location.

48. The computer program product of claim 1 wherein the operation of identifying the reference-based parameter comprises:

identifying within the current code frame a refany-type value as the reference-based parameter.

49. The computer program product of claim 48 wherein the refany-type value contains an address of a memory location and the operation of identifying the programmed operation comprises:

identifying an instruction within the current code frame that is programmed to perform a read access to the address of the refany-type value.

50. The computer program product of claim 48 wherein the refany-type value contains type information related to a memory location referenced by the refany-type value and the operation of identifying the programmed operation comprises:

identifying an instruction within the current code frame that is programmed to perform a read access to the type information.

51. The computer program product of claim 48 wherein the operation of identifying the programmed operation comprises:

identifying an instruction within the current code frame that is programmed to pass the refany-type value to pass a pointer parameter in a call to a subsequent code frame on the runtime call stack.

52. A method of verifying a current code frame of intermediate language code for execution within a runtime call stack of a runtime environment, the intermediate language code being compiled from source code in one or more high level languages, the method comprising:

receiving the current code frame of intermediate language code;

identifying a reference-based parameter in the current code frame, the reference-based parameter referencing a memory location within the runtime environment;

identifying a programmed operation operating on the reference-based parameter within the current code frame; and evaluating the current code frame to determine whether the programmed operation on the reference-based parameter satisfies one or more verification conditions that ensure that the memory location referenced by the reference-based parameter will be valid when accessed during execution within the runtime call stack.

53. The method of claim 52 further comprising:

determining a type state associated with the reference based parameter before the programmed operation; and tracking a change in the type state associated with the referenced based parameter based on an effect of the programmed operation on the type state.

54. The method of claim 52 further comprising:

determining a first type state associated with the reference-based parameter before the programmed operation; and determining a second type state associated with the referenced based parameter after the programmed operation.

55. The method of claim 54 further comprising:

determining an effect of the programmed operation on the first type state to determine the second type state.

56. The method of claim 52 further comprising:

passing the current code frame into the runtime call stack for execution, if the evaluating operation determines that the memory location referenced by the reference-based parameter will remain valid when accessed during execution within the runtime call stack.

57. The method of claim 52 further comprising:

signaling a type check error, if data referenced by the reference-based parameter will not be valid when accessed during execution within the runtime call stack.

58. The method of claim 52 wherein the operation of identifying the referenced-based parameter comprises:

identifying within the current code frame a pointer parameter as the reference-based parameter.

59. A verification module embodied in a computer system for verifying a current code frame of intermediate language code received from a loader for execution within a runtime call stack of a runtime environment, the intermediate language code being compiled from source code in one or more high level languages, the verification module comprising:

a parameter identification module identifying a reference-based parameter in the current code frame, the reference-based parameter referencing a memory location within the runtime environment;

an operation identification module identifying a programmed operation operating on the reference-based parameter within the current code frame; and an evaluation module evaluating the current code frame to determine whether the programmed operation on the reference-based parameter satisfies one or more verification conditions that ensure that the memory location referenced by the reference-based parameter will be valid when accessed during execution within the runtime call stack.

60. A computer program product encoding a computer program for executing on a computer system a computer process for deferring selection of a size of a data type in intermediate language code until after source code compilation to optimize execution for an execution platform architecture having a native register size, the computer process comprising:

compiling source code containing a value of the data type to generate the intermediate language code;

generating metadata describing the data type as having a natural data type size;

reading the metadata to determine that the selection of the size of the data type has been deferred;

determining the native register size of the execution platform architecture; and compiling the intermediate code to allocate the size of the value in accordance with the native register size of the execution platform architecture.

61. A compiler system embodied in a computer system for deferring selection of a size of a data type in intermediate language code until after source code compilation to optimize execution for an execution platform architecture having a native register size, the compiler system comprising:

a source code compiler generating the intermediate language code containing a value of the data type and metadata code describing the data type as having a natural data type size; and a just-in-time compiler reading the metadata to determine that the selection of the size of the data type has been deferred and compiling the intermediate code to allocate the size of the value in accordance with the native register size of the execution platform architecture.

62. A method of deferring selection of a size of a data type in intermediate language code until after source code compilation to optimize execution for an execution platform architecture having a native register size, the method comprising:

compiling source code containing a value of the data type to generate the intermediate language code;

generating metadata describing the data type as having a natural data type size;

reading the metadata to determine that the selection of the size of the data type has been deferred;

determining the native register size of the execution platform architecture; and compiling the intermediate code to allocate the size for the value in accordance with the native register size of the execution platform architecture.

63. A computer program product encoding a computer program for executing on a computer system a computer process for verifying a current code frame of intermediate language code for execution within a runtime call stack of a runtime environment, the intermediate language code being compiled from source code in one or more high level languages, the computer process comprising:

receiving the current code frame of intermediate language code;

identifying a value class parameter having a type in the current code frame;

identifying an instruction within the current code frame programmed to communicate the value class parameter with another code frame; and evaluating the current code frame to determine whether the instruction satisfies one or more verification conditions that ensure that the type of the value class parameter is consistently defined in both the current code frame and the other code frame.

64. The computer program product of claim 63 wherein the computer process further comprises:
   determining a type state associated with the value class parameter before a programmed operation; and
   tracking a change in the type state associated with the value class parameter based on an effect of the programmed operation on the type state.

65. The computer program product of claim 63 wherein the computer process further comprises:
   determining a first type state associated with the value class parameter before a programmed operation; and
   determining a second type state associated with the value class parameter after the programmed operation.

66. The computer program product of claim 65 wherein the computer process further comprises:
   determining an effect of the programmed operation on the first type state to determine the second type state.

67. The computer program product of claim 63 wherein the operation of identifying an instruction comprises:
   identifying an instruction within the current code frame programmed to pass the value class parameter in a method call to a subsequent code frame.

68. The computer program product of claim 67 wherein the evaluating operation comprises:
   determining that the instruction is programmed to pass the value class parameter by value in the method call to the subsequent code frame to satisfy a verification condition.

69. The computer program product of claim 67 wherein the evaluating operation comprises:
   determining that the instruction is programmed to pass the value class parameter reference in the method call to the subsequent code frame; and further comprising:
   signaling a type check error to prevent execution of the current code frame.

70. The computer program product of claim 67 wherein the evaluating operation comprises:
   determining that the instruction is programmed to return the value class parameter by value in the method call to the subsequent code frame to satisfy a verification condition.

71. The computer program product of claim 67 wherein the evaluating operation comprises:
   determining that the instruction is programmed to return the value class parameter reference in the method call to the subsequent code frame; and further comprising:
   signaling a type check error to prevent execution of the current code frame.

72. The computer program product of claim 63 wherein the operation of identifying an instruction comprises:
   identifying an instruction within the current code frame programmed to return the value class parameter in a method call to a subsequent code frame.

73. The computer program product of claim 63 wherein the computer process further comprises:
   tracking instructions causing explicit initializations to one or more fields within the value class parameter.

74. The computer program product of claim 73 wherein the computer process further comprises:
   detecting an instruction that read accesses a field of the value class parameter; and signaling an error if the field has not been explicitly initialized, responsive to the tracking operation.

75. A method of verifying a current code frame of intermediate language code for execution within a runtime call stack of a runtime environment, the intermediate language code being compiled from source code in one or more high level languages, the method comprising:
   receiving the current code frame of intermediate language code;
   identifying a value class parameter having a type in the current code frame;
   identifying an instruction within the current code frame programmed to communicate the value class parameter with another code frame; and
   evaluating the current code frame to determine whether the instruction satisfies one or more verification conditions that ensure that the type of the value class parameter is consistently defined in both the current code frame and the other code frame.

76. The method of claim 75 further comprising:
   determining a type state associated with the value class parameter before a programmed operation; and
   tracking a change in the type state associated with the value class parameter based on an effect of the programmed operation on the type state.

77. The method of claim 75 further comprising:
   determining a first type state associated with the value class parameter before a programmed operation; and
   determining a second type state associated with the value class parameter after the programmed operation.

78. The method of claim 77 further comprising:
   determining an effect of the programmed operation on the first type state to determine the second type state.

79. The method of claim 75 wherein the operation of identifying an instruction comprises:
   identifying an instruction within the current code frame programmed to pass the value class parameter in a method call to a subsequent code frame.

80. The method of claim 79 wherein the evaluating operation comprises:
   determining that the instruction is programmed to pass the value class parameter by value in the method call to the subsequent code frame to satisfy a verification condition.

81. The method of claim 79 wherein the evaluating operation comprises:
   determining that the instruction is programmed to pass the value class parameter reference in the method call to the subsequent code frame; and further comprising:
   signaling a type check error to prevent execution of the current code frame.

82. The method of claim 79 wherein the evaluating operation comprises:
   determining that the instruction is programmed to return the value class parameter by value in the method call to the subsequent code frame to satisfy a verification condition.

83. The method of claim 79 wherein the evaluating operation comprises:
   determining that the instruction is programmed to return the value class parameter reference in the method call to the subsequent code frame; and further comprising:
   signaling a type check error to prevent execution of the current code frame.

84. The method of claim 75 wherein the operation of identifying an instruction comprises:

identifying an instruction within the current code frame programmed to return the value class parameter in a method call to a subsequent code frame.

85. The method of claim 75 further comprising:

tracking instructions causing explicit initializations to one or more fields within the value class parameter.

86. The method of claim 85 further comprising:

detecting an instruction that read accesses a field of the value class parameter; and signaling an error if the field has not been explicitly initialized, responsive to the tracking operation.

* * * * *